(12) United States Patent
Kishida et al.

(10) Patent No.: US 7,542,856 B2
(45) Date of Patent: Jun. 2, 2009

(54) STRUCTURE MONITOR SYSTEM

(75) Inventors: Kinzo Kishida, Kobe (JP); Motohiro Nakano, Kobe (JP); Yoshiaki Yamauchi, Kobe (JP)

(73) Assignee: Neubrex Co., Ltd. (JP)

( * ) Notice: Subject to any disclaimer, the term of this patent is extended or adjusted under 35 U.S.C. 154(b) by 579 days.

(21) Appl. No.: 10/562,922

(22) PCT Filed: Jul. 2, 2003

(86) PCT No.: PCT/JP03/08395

§ 371 (c)(1),
(2), (4) Date: Dec. 29, 2005

(87) PCT Pub. No.: WO2005/003689

PCT Pub. Date: Jan. 13, 2005

(65) Prior Publication Data

US 2008/0177482 A1 Jul. 24, 2008

(51) Int. Cl.
G01B 5/30 (2006.01)
(52) U.S. Cl. .......................................... 702/35; 702/36
(58) Field of Classification Search ............... 702/33–37
See application file for complete search history.

(56) References Cited

U.S. PATENT DOCUMENTS 4,650,281 A * 3/1987 Jaeger et al. ................. 385/127
2004/0246489 A1* 12/2004 Kinugasa et al. ............ 356/477

FOREIGN PATENT DOCUMENTS

| JP | 5-062081 | 3/1993 |
| JP | 5-231956 | 9/1993 |
| JP | 11-287650 | 10/1999 |
| JP | 2002-340741 | 11/2002 |

OTHER PUBLICATIONS

English Translation of JP 2002-340741, Nov. 2002.*

* cited by examiner

*Primary Examiner*—Michael P Nghiem
(74) *Attorney, Agent, or Firm*—Gerald E. Hespos; Anthony J. Casella

(57) ABSTRACT

A structure monitor system comprising a measuring unit 3 for measuring distortions of the structure S at respective points on a boundary by using an optical fiber sensor 2 laid on the boundary of the structure, numerical analysis unit 5 for calculating a distortion at a specified point on the structure S by a numerical analysis method with distortions measured by the measuring unit as a boundary condition, and a display unit 6 for displaying information on an analysis distortion by the numerical analysis unit 5 in a association with a position on the structure S.

24 Claims, 15 Drawing Sheets

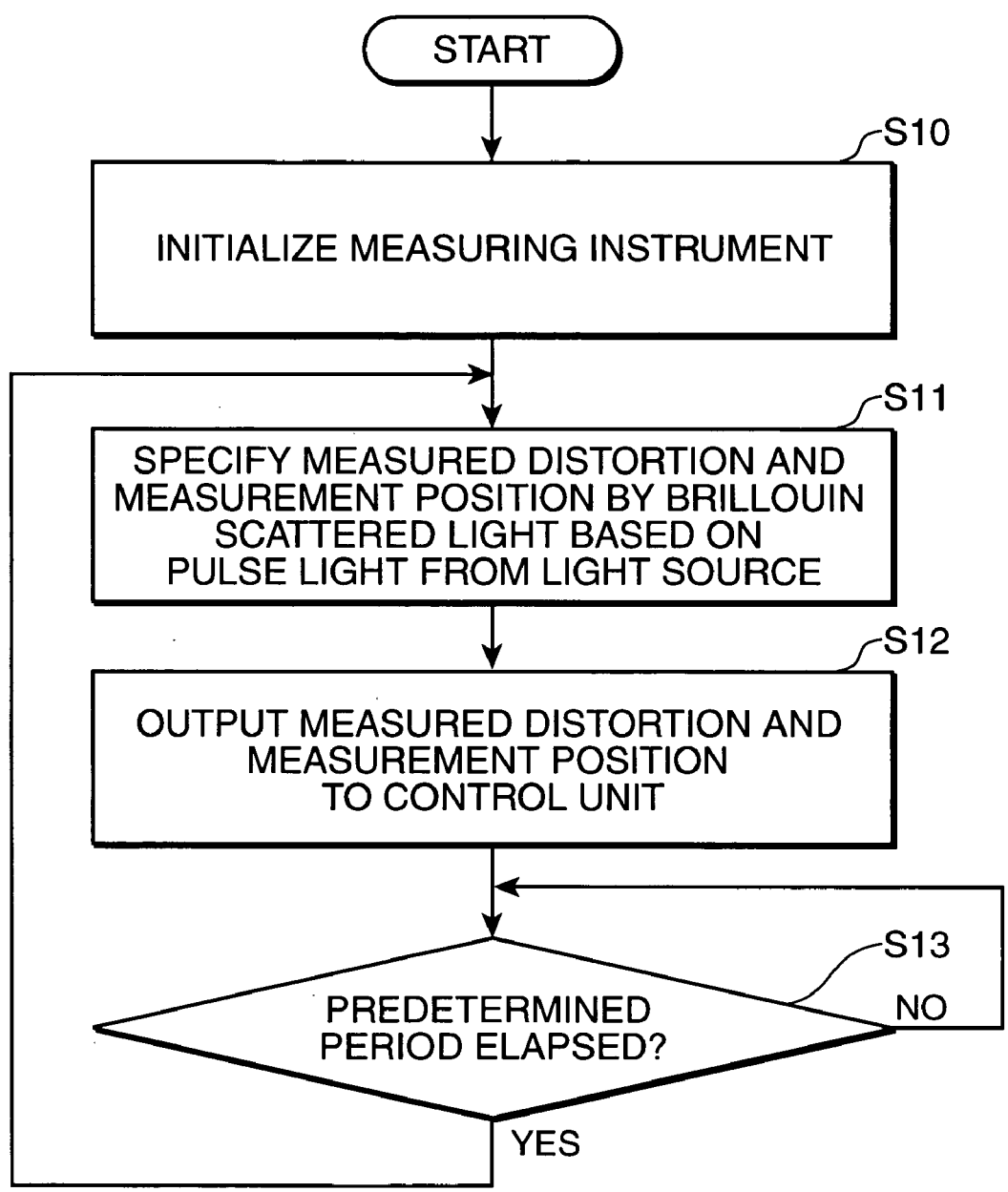

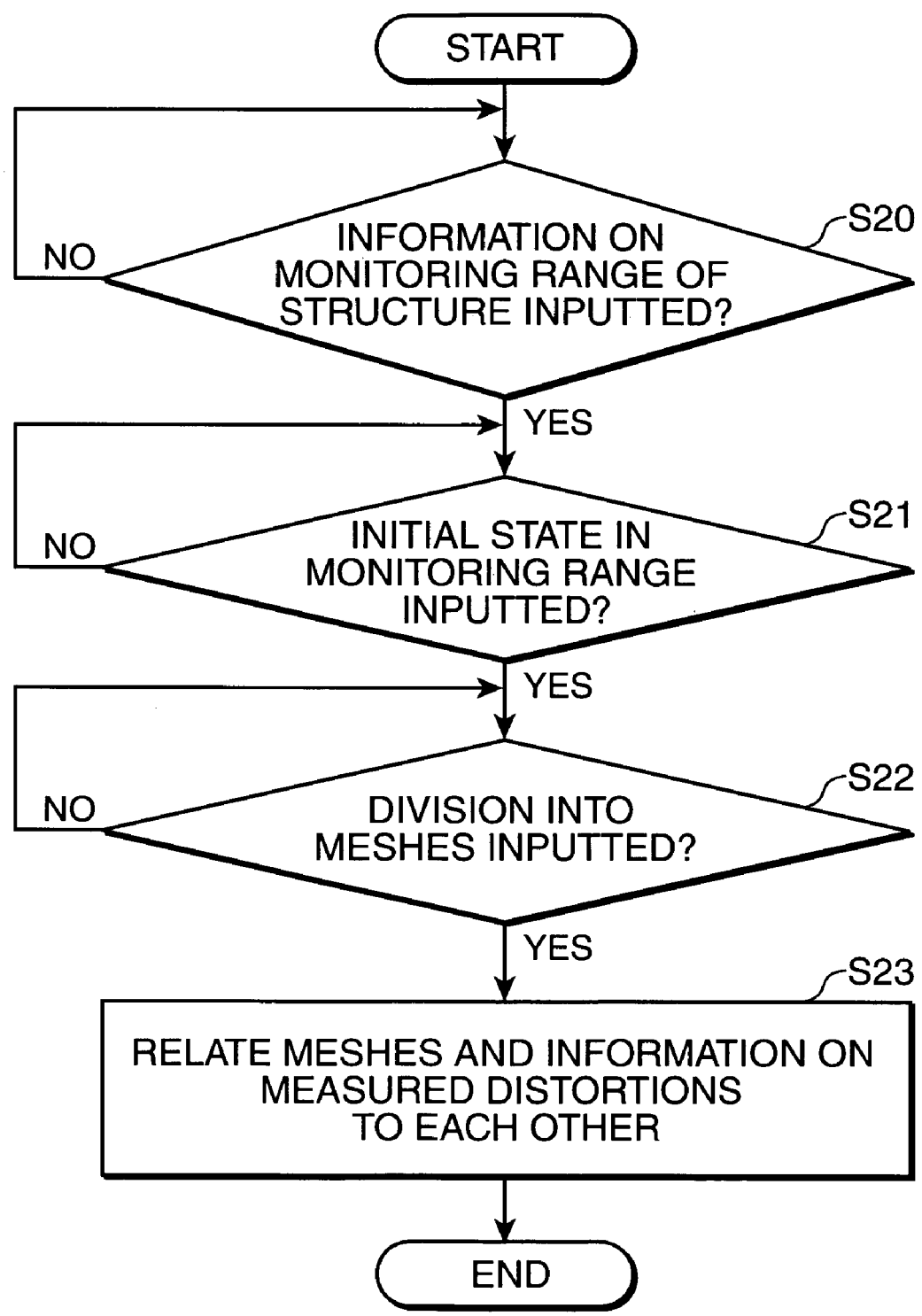

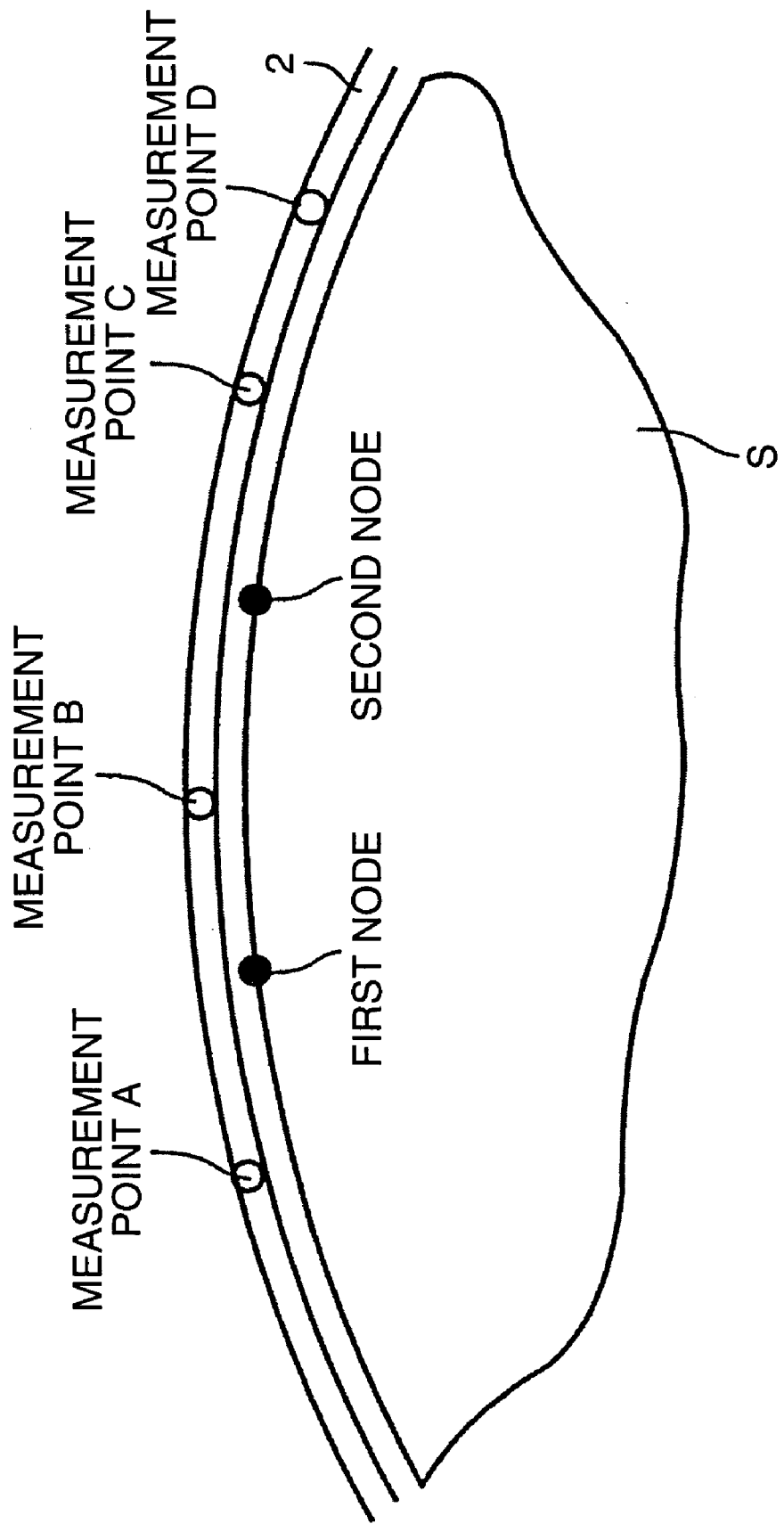

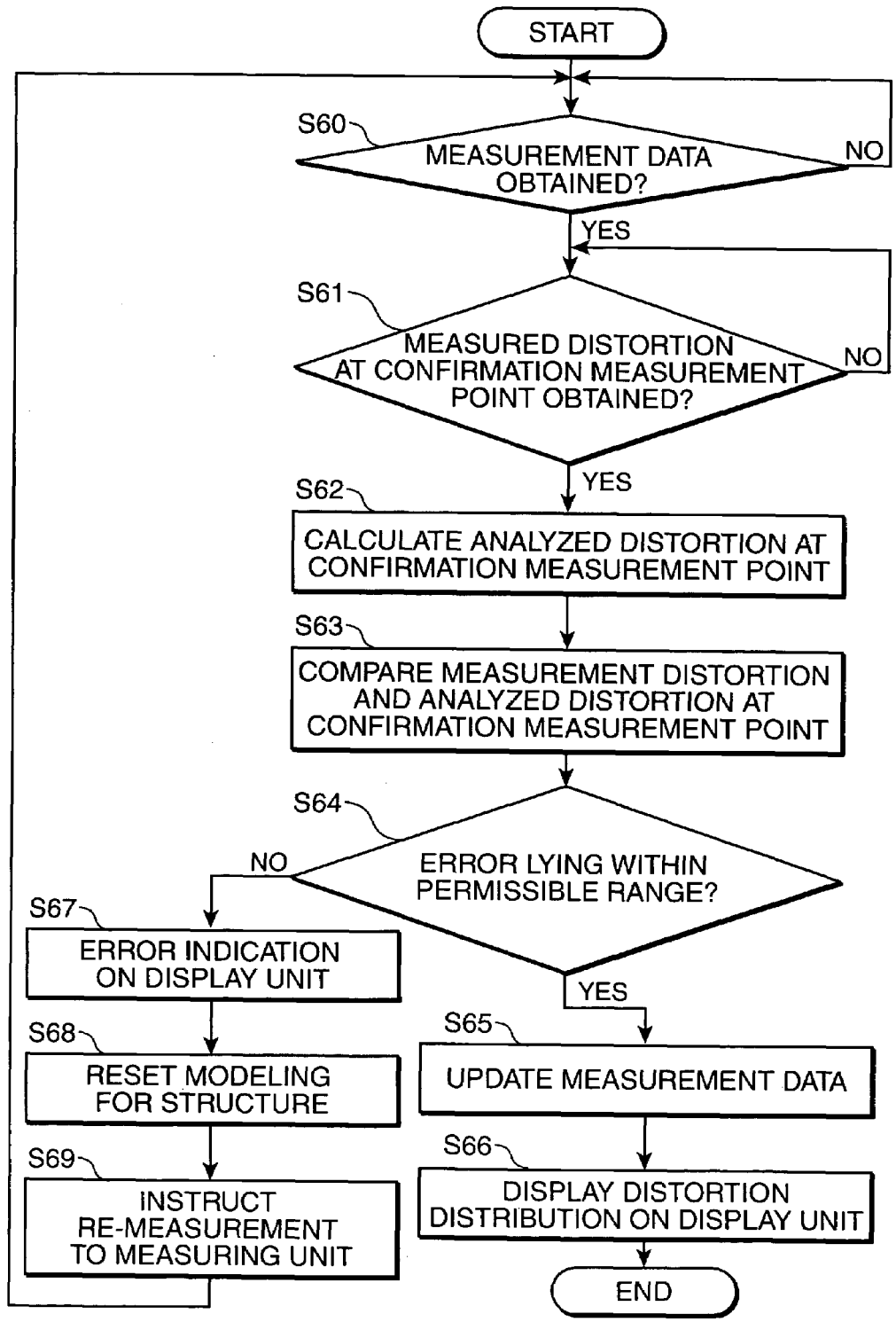

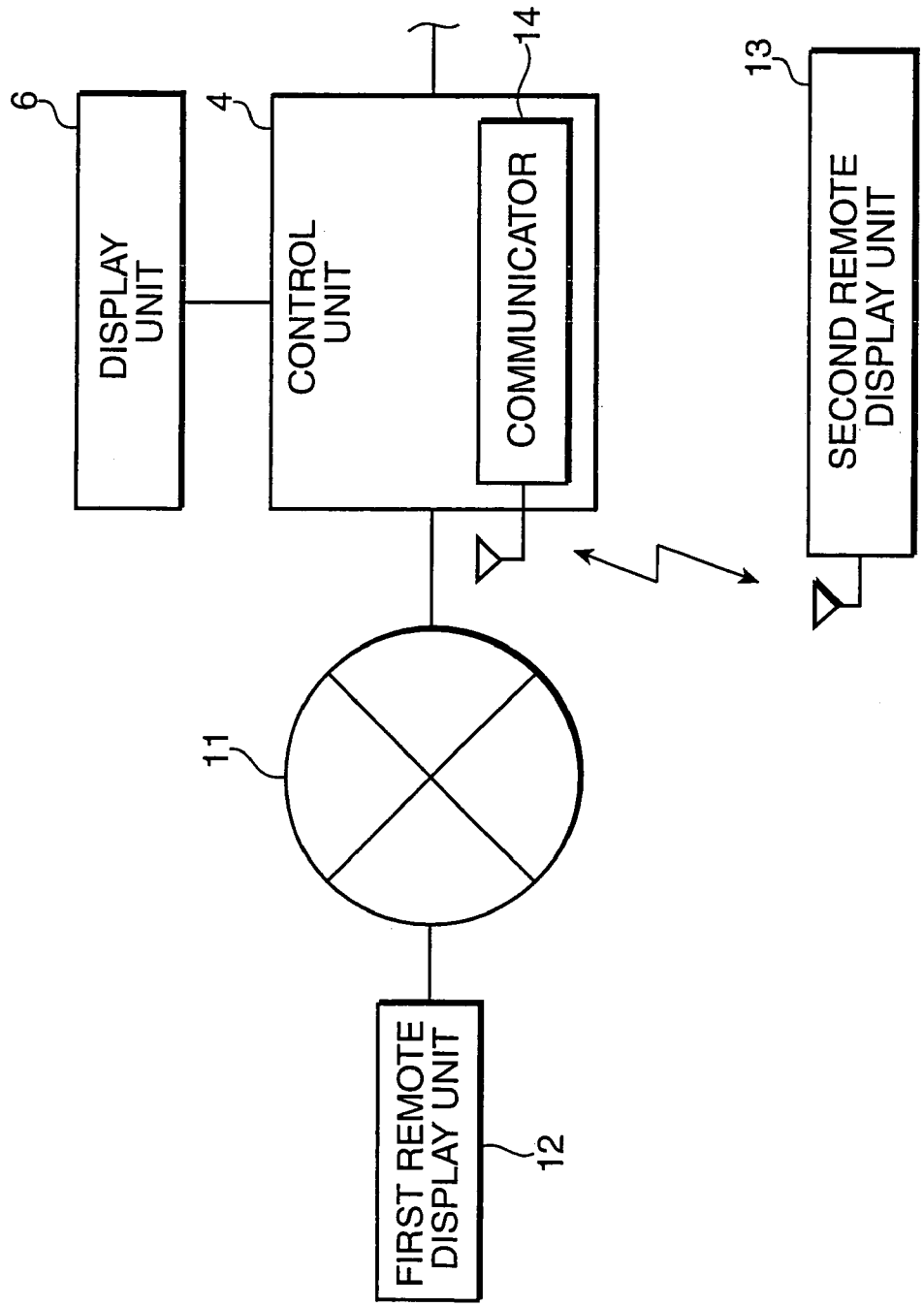

STRUCTURE MONITOR SYSTEM

BACKGROUND OF THE INVENTION

1. Field of the Invention

The present invention relates to a structure monitor system for measuring a physical quantity such as temperature, distortion or the like of a structure using an optical fiber sensor.

2. Description of the Related Art

In recent years, there have been developed structure monitor systems for measuring and monitoring a change in a physical quantity of a structure such as a tunnel, a bridge or a building using a distribution-type optical fiber sensor for measuring a distribution of the physical quantity such as temperature and distortion making the most use of properties of an optical fiber.

For example, Japanese Unexamined Patent Publication No. H11-287650 discloses a structure monitor system for detecting the deformation of a tunnel based on information from a distribution-type optical fiber sensor laid on the inner circumferential surface of the tunnel in a meandering manner along the longitudinal direction of the tunnel.

Specifically, this structure monitor system is constructed such that the looped optical fiber sensor, which is looped a specified number of times per unit looped section length, is laid along the longitudinal axis of the tunnel while reciprocating along the circumferential direction of the tunnel, and a distortion distribution meter is connected with one end of this looped optical fiber sensor to cause a pulse light to be incident on the looped optical fiber sensor and receive a Brillouin scattered light from the looped optical fiber sensor based on the pulse light, thereby measuring the distortion. In this structure monitor system, a change in the shape of the tunnel can be continuously monitored in a place remote from a spot, and three-dimensional distortions can be detected with high precision by the looped optical fiber sensor.

However, since the optical fiber sensor is laid on the inner wall surface of the tunnel in the above structure monitor system, distortions at positions near the inner wall surface (outer surface) of the tunnel can be detected with high precision, but it has been difficult to measure distortion inside the inner wall, particularly those at positions distant from the optical fiber sensor.

Further, the optical fiber sensor cannot be minutely laid on the inner wall surface of the tunnel for the technical or economical reason, and is laid along the circumferential direction of the tunnel at specified intervals in the longitudinal direction of the tunnel. Thus, it has been difficult to highly precisely measure distortions at positions where the optical fiber sensor is not laid even though these distortions are located at positions near the inner wall surface of the tunnel.

Accordingly, with the above prior art structure monitor system, it is difficult to highly precisely detect distortions at positions inside the inner wall of the tunnel and those at positions where the optical fiber sensor is not laid although these positions are located near the inner wall surface. For example, even if a crack is created inside the inner wall as the distortion increases, only rough monitoring can be carried out. It is necessary to go to the spot and carry out a minute reexamination in order to specify the position and size of the crack. This leads to an inconvenience of necessitating much time and labor.

SUMMARY OF THE INVENTION

In view of the background technology, an object of the present invention is to provide a structure monitor system which can estimate a physical quantity such as a distortion and a temperature at a position distant from a position where an optical fiber sensor is laid, and monitor a physical quantity at every position of a structure with high precision.

According to an aspect of the invention, a structure monitor system for analyzing a temperature, a distortion or a like physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid on the boundary of the structure, measuring physical quantities of the structure at points on the boundary of the structure where the optical fiber sensor is laid, a numerically analyzing means for calculating the physical quantity at the specified point of the structure by the numerical analysis method using the measured physical quantities by the measuring means as the boundary condition, and a display means for displaying information on the analyzed physical quantity by the numerical analyzing means in relation to the position of the structure.

BRIEF DESCRIPTION OF THE DRAWINGS

FIG. 3 is a flow chart showing a processing of a measuring unit in the structure monitor system, FIG. 4 is a flow chart showing an initial setting of a numerical analyzer in the structure monitor system, FIG. 6 is a schematic diagram showing a relationship between nodes of a disk body S and measurement points by the optical fiber sensor, FIG. 14 is a flow chart showing an analysis processing of a numerical analyzer of the structure monitor system, and FIG. 15 is a construction diagram showing a structure monitor system according to a seventh embodiment.

DETAILED DESCRIPTION OF THE PREFERRED EMBODIMENTS OF THE INVENTION

Figure 1:
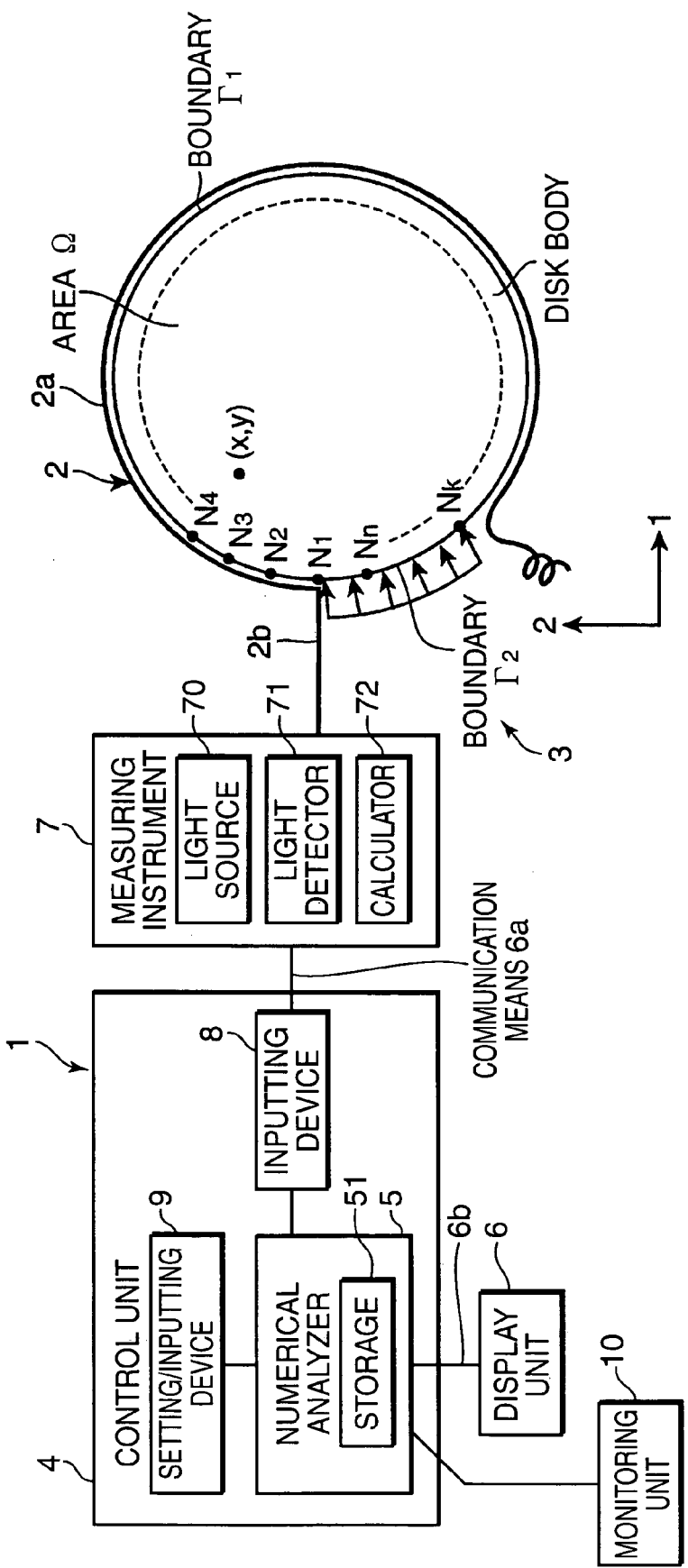
FIG. 1 is a construction diagram of a structure monitor system according to a first embodiment of the invention.

Hereinafter, embodiments of the present invention are described with reference to the accompanying drawings. The same construction in the respective drawings is identified by the same reference numerals, and no repeated description is given thereon.

First Embodiment

FIG. 1 is a construction diagram entirely showing a structure monitor system according to a first embodiment. This structure monitor system 1 monitors a distribution of distortion (physical quantity) in a disk body S as a structure to be monitored. It should be noted that a two-dimensional elasticity problem is described in the first embodiment.

Here, the disk member S is assumed to be such that no surface force (hereinafter, "traction") acts on a boundary $\Gamma_1$ to be described later and, on the other hand, displacement is restricted on a boundary $\Gamma_2$ to be described later. This structure monitor system 1 monitors a change in distortion accompanying the deterioration of a material.

This structure monitor system 1 is provided with a measuring unit (measuring means) 3 including an optical fiber sensor 2, a control unit (control means) 4 electrically connected with the measuring unit 3 via a communication means 6a, a display unit (display means) 6 electrically connected with the control unit 4 via a communication means 6b, and a monitoring unit 10 electrically connected with the control unit 4.

The measuring unit 3 measures the distortion of the disk body S with high resolution and includes a measuring instrument 7 and the optical fiber sensor 2 having one end thereof connected with this measuring instrument 7 and fixed along the peripheral edge of the disk body S.

The measuring instrument 7 causes a measurement light to be incident on the optical fiber sensor 2 and receives a Brillouin scattered light based on the measurement light to measure a distortion distribution. This measuring instrument 7 has a built-in timer (not shown), measures the distortion distribution at specified time intervals, for examples, at time intervals of 1 hour and, if necessary, measures the distortion distribution in accordance with an output from the control unit 4. A known light transmitter/receiver can be used as the measuring instrument 7. For example, a light transmitting/receiver is used which includes a light source 70 for supplying a pulse light of a specified frequency to the optical fiber sensor 2, a light detector 71 for receiving the Brillouin scattered light of a specified frequency and converting it into an electrical signal, and a calculator 72 for calculating the distortion in accordance with the electrical signal.

Various semiconductor lasers such as distribution feedback semiconductor lasers and distribution Bragg reflection lasers can be, for example, used as the light source 70. The light detector 71 will do as long as it receives the Brillouin scattered light and outputs the electrical signal in accordance with the received light. For example, the light detector 71 includes a light receiver for converting a received light into an electrical signal corresponding to the light intensity of the received light and a band-pass filter for transmitting only electrical signals lying in a specified frequency band. A computer for executing specified calculations such as a personal computer instrumented with a microprocessor can be, for example, used as the calculator 72.

The optical fiber sensor 2 is of the distribution type for measuring a distribution of a physical quantity such as a distortion or a temperature at the position where the optical fiber sensor 2 is laid, and includes an optical fiber made of quartz. In the first embodiment, the optical fiber sensor 2 is used to measure a distortion distribution of the disk body S. This optical fiber sensor 2 needs to be laid on the outer surface of or inside a structure to be analyzed. In the first embodiment, the optical fiber sensor 2 is fixed by being wound around a part of the peripheral edge (outer surface) of the disk body S, and is divided into a physical quantity detecting section 2a deformable according to the deformation of the disk body S and an intermediating section 2b connecting the light detector 71 and the physical quantity detecting section 2a without being fixed to the disk body S.

Figure 2A:
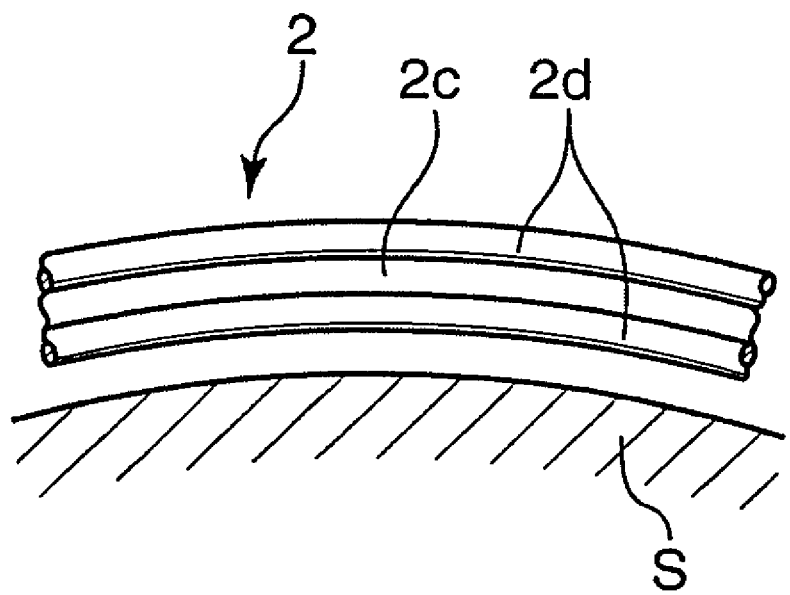
FIG. 2 is front views showing arrangement modes of optical fiber sensors.

The physical quantity detecting section 2a is fixed to the disk body S over the entire length thereof, and is capable of measuring the physical quantity at a plurality of measurement points. Particularly in the first embodiment, the optical fiber sensor 2 including the physical quantity detecting section 2a of high precision is used so that the measurement points can be set at intervals of 5 cm or shorter. Further, as shown in FIG. 2A, the physical quantity detecting section 2a is formed by fixing a plurality of (two in the example) optical fibers 2d to a base member 2c while spacing them apart by a specified distance. In the first embodiment, the two optical fibers 2d are arranged side by side along the radial directions of the disk body S with the base member 2c provided therebetween, the distortion distribution as the physical quantity in the disk body S can be measured with high precision, and physical quantities such as distortions measured by the respective optical fibers 2d at the same measurement point of the disk body S are compared, whereby a cause of the change in the physical quantity can be specified. Specifically, if both distortions measured by the two optical fibers 2d, for example, increase or decrease, this indicates that a unidirectional tensile stress or compressive stress acts at the measurement point of the disk body S. If one measured distortion increases while the other measured distortion decreases, this indicates that a bending moment acts at the measurement point.

If the physical quantity detecting section 2a includes a plurality of optical fibers 2d in this way, the intermediating section 2b of the optical fiber sensor 2 may include a plurality of optical fibers in conformity with the number of the physical quantity detecting section 2a or may include a single optical fiber obtained by bundling these optical fibers into one.

Figure 2B:
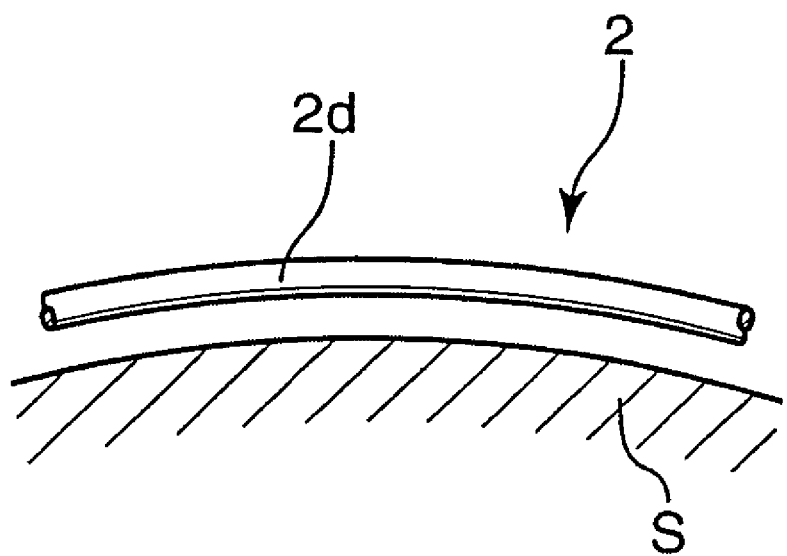

The optical fiber sensor 2 may not include a plurality of optical fibers as in the first embodiment and may include one optical fiber 2d, for example, as shown in FIG. 2B.

Further, this optical fiber sensor 2 is capable of measuring a physical quantity at as many positions as the number of pieces of unknown node information, which are at least unknown tractions or displacement values at later-described nodes of the structure. Since either one of the traction and the displacement is unknown at all the nodes in the structure S in the first embodiment, the optical fiber sensor 2 is so constructed as to be able to measure (k−1) distortions (quantities) at positions corresponding to the first to (k−1)th nodes.

In the case of measuring only the temperature without measuring the distortion, it is not always necessary to fix the physical quantity detecting section 2a. Further, the physical quantity detecting section 2a needs not be fixed to the disk body S over its entire length, and may be fixed to the disk body S at specified intervals by holding jigs. However, if the physical quantity detecting section 2a is fixed to the disk body S over the entire length, it is advantageous because a minute measurement is possible.

The measuring unit 3 is so constructed as to output the measured distortion (measured physical quantity) to the control unit 4.

The control unit 4 controls the respective units of the structure monitor system 1 and includes a computer, for example, instrumented with a microprocessor. This control unit 4 includes a numerical analyzer 5, an inputting device 8, and a setting/inputting device 9.

The numerical analyzer 5 saves the measured distortion (measured physical quantity) by the measuring unit 3 inputted by the inputting device 8 in a storage 51, and analyzes the distortion (physical quantity to be analyzed) at a specified point of the disk body S based on the saved information by a numerical analysis method set beforehand. The numerical analyzer 3 is constructed, for example, as a computer capable of high-speed operations. In the first embodiment, a boundary element method according to which a boundary integral equation derived from a governing equation of the disk body S is discretized to derive algebraic equations (simultaneous linear equations), initial conditions and boundary conditions are put into these simultaneous linear equations to calculate a physical quantity is adopted as the numerical analysis method executed in the numerical analyzer 5. The analysis technique by this boundary element method will be briefly described later. A distortion, a traction and a displacement value measured beforehand by specific apparatuses or the like are used as the initial conditions, whereas the distortions measured by the measuring unit 3, an analyzed distortion calculated from the measured distortions, an analyzed traction, an analyzed displacement value and the like are used as the boundary conditions. Since the distortions measured by the measuring unit 3, the analyzed distortion calculated from the measured distortions and the like are used as the boundary conditions in this way, the analyzed distortion at a specified point of the disk body S by the numerical analyzer 5 can be automatically obtained at specified time intervals.

The storage 51 includes, for example, a ROM (read only memory) or a RAM (random access memory), and a program for causing the respective units to operate, the measured distortions (measured physical quantities), the analyzed distortion (analyzed physical quantity) as an analysis result of the numerical analyzer 5, derived tractions to be described later, derived displacement values (derived physical quantities) and the like are saved therein.

The inputting device 8 is used to save the measured distortions obtained from the measuring unit 3 and information (measurement data) on the coordinates of the measurement points in the storage 51 of the numerical analyzer 5 while relating them to each other. The setting/inputting device 9 inputs various input data to the numerical analyzer 5. Input data to be inputted by the setting/inputting device 9 include, for example, the boundary integral equation and a basic solution derived from the governing equation of the disk body S to be described later, information on a material constant included in the boundary conditions and the shape of the disk body S (e.g. thickness, diameter and material constant) and modeling-related items such as the coordinates and numbers of the nodes of the disk body S.

The display unit 6 displays the analyzed distortions as the analysis results by the numerical analyzer 5 in relation to the positions of the disk body S. For example, the distortion distribution of the disk body S is displayed as a contour figure. For example, a display such as a CRT, a liquid crystal panel or an organic EL can be used as the display unit 6.

The monitoring unit 10 (notifying means) gives a notification to a user if an average value of the analyzed distortions as the analysis results by the numerical analyzer 5 exceeds a predetermined value set beforehand. For example, the monitoring unit 10 is so constructed as to make a visual notification by means of a warning light, make an audio notification by means of an alarm sound, or transmit a message to a user by means of an installed communicator. The predetermined value is set to be slightly smaller than a total value of the distortions at all the measurement points, which total value is assumed in the case that a problem such as damage in the disk body S occurs or in the case that a problem possibly occurs. This predetermined value is saved in the storage 51 of the numerical analyzer 5, and a signal is outputted from the numerical analyzer 5 to the monitoring unit 10 upon exceeding this predetermined value. Upon receiving this signal, the monitoring unit 10 makes a corresponding notification to the user, and the position of the disk body S where this problem has occurred is specified on the display unit 6.

Next, the operation of the structure monitor system 1 according to the first embodiment is described. FIG. 3 is a flow chart showing the operation in the measuring instrument 7.

When the processing is started, the respective devices of the measuring instrument 7 are first initialized and initial setting is carried out as a preparation for the measurement of the distortion by the optical fiber sensor 2 (Step S10). Subsequently, the light source 70 is caused to operate to emit a specified pulse light, whereupon a Brillouin scattered light based on this pulse light is sampled over the entire length of the physical quantity detecting section 2a by the light detector 71, whereas the measured distortion is calculated using a scattering gain spectrum based on this sampling and the coordinates of the measurement point are calculated using a time required for the sampling in the calculator 72 (Step S11).

Then, a measurement data including the measured distortion and information on the place of measurement is outputted to the inputting device 8 of the control unit 4 via the communication means 6a (Step S12). Subsequently, the processing from Step S11 to Step S12 is carried out again after the elapse of a predetermined period (e.g. after the elapse of 1 hour) (Step S13). Specifically, whether or not the predetermined period set beforehand has elapsed is judged, and a standby state is entered if the predetermined period has not yet elapsed (NO in Step S13), whereas this routine returns to Step S11 to specify the measured distortion and the coordinates of the measurement point again upon the elapse of the predetermined period.

The distortion at the specified point of the disk body is analyzed in the numerical analyzer 5 based on the measurement data such as the measured distortion outputted from the measuring instrument 7 to the inputting device 8. The following initial setting is carried out in the numerical analyzer 5 before the processing for this analysis is executed.

FIG. 4 is a flow chart showing the initial setting in the numerical analyzer 5. When this initial setting is started, information on a monitoring range of the structure is first inputted to the numerical analyzer 5 (Step S20). Specifically, in the first embodiment, information on the planar shape of the disk body S as the structure and information on analysis points located inside or on the boundary of the disk body S where the distortions are analyzed by the numerical analyzer 5 (e.g. the coordinates and number of the analysis points) are inputted via the setting/inputting device 9, and the input data including the shape data is saved in the storage 51.

Upon the input of the information on the monitoring range of the structure (YES in Step S20), an input of an initial state concerning the monitoring range is received (Step S21).

The initial state concerning the monitoring range includes initial conditions such as a load initially acting on the disk body S and a condition on the displacement value, and differs depending on whether the physical quantity at the analysis point is obtained as a relative quantity to an initial physical quantity (i.e. obtained as an increase or a decrease from the initial physical quantity as a basis) or as an absolute quantity in consideration of the initial physical quantity (i.e. an actual physical quantity is obtained).

Since a relative variation from the laid state is measured in the optical fiber sensor 2, the quality of the obtained physical quantity differs depending on how the initial conditions are set.

Specifically, in the former case (in the case of obtaining the physical quantity as a relative quantity), the traction of zero on the boundary $\Gamma_1$ and the displacement value of zero on the boundary $\Gamma_2$ are inputted, whereupon the tractions, the displacement values and the distortions on the boundaries $\Gamma_1$, $\Gamma_2$ are calculated as relative variations from the initial state.

On the other hand, in the latter case (in the case of obtaining the physical quantity as an absolute quantity), the tractions on the boundary $\Gamma_1$ are measured beforehand by a specific apparatus and this measurement result is inputted as an initial condition, and the displacement values on the boundary $\Gamma_2$ are inputted as an initial condition although being zero, whereupon the tractions, the displacement values and the distortions on the boundaries $\Gamma_1$, $\Gamma_2$ are calculated as absolute quantities (true values) from the initial state.

If the optical fiber sensor 2 is laid while no stress acts on the disk body S and the disk body S is not deformed, the relative quantities and the absolute quantities are equal. It is assumed in the first embodiment that the optical fiber sensor 2 is laid in such a state, and the physical quantities can be, therefore, calculated as true values by a method to be described later.

These initial boundary conditions are inputted via the setting/inputting device 9, and this input data is saved in the storage 51.

When the initial state concerning the monitoring range is inputted (YES in Step S21), a plurality of nodes are set on a boundary $\Gamma(\Gamma=\Gamma_1+\Gamma_2)$ of the disk body S, the boundary $\Gamma$ is divided into a plurality of elements or meshes, and an input of information on the division into these elements is received in the numerical analyzer 5 (Step S22). Specifically, a plurality of nodes, the first node to N-th node, are provided on the boundary $\Gamma$ that is the outer periphery of the disk body S, and the positions (coordinates) of these nodes are related to node numbers. These pieces of information are inputted via the setting/inputting device 9, and this input data is saved in the storage 51 (Step S22).

Here, precision is higher as the nodes are set at smaller intervals, whereas an amount of calculation is increased as the number of nodes increases, thereby resulting in a decrease in analyzing speed. Accordingly, the nodes may be set at even intervals, or the intervals between the nodes may be changed. For example, they may be shortened for positions required to have analysis results of high precision due to larger variations of the physical quantities such as displacements and stresses. A relationship between these nodes and the division into elements and the like are known, for example, in the boundary element method. Since they are disclosed in detail in Japanese Unexamined Patent Publication No. H02-168117 or "Computational Mechanics and CAE Series 2—Boundary Element Method" written under joint authorship of Tanaka, Matsumoto, Nakamura, $1^{st}$ edition, published by Baifukan and other publications, no description is given here. In the first embodiment, the above relationship is set such that physical quantities on the respective elements as linear elements can be represented by physical quantities at the nodes.

Subsequently, when information on the division into elements is inputted (YES in Step S22), the node information saved in the storage 51 and the information on the measured distortions are related to each other in the numerical analyzer 5 (Step S23). Specifically, if the measurement coordinates measured by the optical fiber sensor 2 and the coordinates where the node is provided are identical, a distortion value at this node number is saved as a distortion value measured by the optical fiber sensor 2.

After the initial setting is carried out in the numerical analyzer 5 as described above, the distortion is analyzed in the numerical analyzer 5.

First, the numerical analysis method used in the numerical analyzer 5 is briefly described.

According to this numerical analysis method, a plurality of (N in the first embodiment) nodes are set on a boundary of a part of the structure to be analyzed; tractions (derived tractions) and displacement values (derived displacement values) at all the nodes are obtained; and the derived tractions and the derived displacement values are substituted into the boundary integral equation to be described later to analyze the distortion value at an arbitrary point inside or on the boundary of the part to be analyzed.

Specifically, the boundary integral equation derived from the governing equation of the structure in a static elasticity problem as in the first embodiment is expressed by the following equation.

$$c_{ij}u_{i(y)} = \int_\Gamma u^*_{ij(x,y)} t_{i(x)} d\Gamma_{(x)} - \int_\Gamma t^*_{ij(x,y)} u_{i(x)} d\Gamma_{(x)} + \int_\Omega u^*_{ij(x,y)} b_{i(x)} d\Omega_{(x)}, \; y \in \Omega \quad \text{(Equation 1)}$$

Here, $c_{ij}$ is a constant matrix determined by the position of point y, $u_j(D)$ is a displacement value at point D, and $t_j(E)$ is a traction at point E. Further, $u^*_{ij}$ and $t^*_{ij}$ are basic solutions called Kelvin's solutions, and solutions of a Laplace equation in the case that a unit concentrated force acts at one point x within an area having an infinite extent are normally used. These solutions are given by the following equations in the case of a two-dimensional problem.

$$u^*_{ij(x,y)} = \frac{1}{8\pi G(1-r)} \left\{ (3-4r)\delta_{ij} l_n\left(\frac{1}{r}\right) + r_{,i}\, r_{,j} \right\} \quad \text{(Equation 2)}$$

$$t^*_{ij(x,y)} = \frac{-1}{4\pi(1-r)} \left\{ \frac{\partial r}{\partial n}(1-2r)\delta_{ij} + 2r_{,i}\, r_{,j} \right\} + (1-2r)(r_{,i} n_j - r_{,j} n_i) \quad \text{(Equation 3)}$$

Here, r is a distance between points x and y, $n_i$ is a unit normal vector at point x, and $\partial r/\partial n$ is a differential coefficient of r in normal direction at point x. Further, G, $\nu$ are a shear elasticity coefficient and a Poisson ratio, respectively. $t^*_{ij}$ that is a basic solution is expressed as a function including a reciprocal of r that is the distance between points x and y and diverges to $\infty$ if points x, y coincide due to peculiarity.

Since the equation (1) is for calculating the displacement at point y, a distortion $\epsilon$ in a certain direction (one direction in the following equation) can be calculated if partial differentiation is applied to this displacement.

$$\varepsilon_{j1} = \frac{\partial u_{j(y)}}{\partial y1} = \int_\Gamma \varepsilon^*_{ij1} \cdot t_{i(x)} d\Gamma_{(x)} - \int_\Gamma \lambda^*_{ij1} u_i \cdot u_{i(x)} d\Gamma_{(x)} \quad \text{(Equation 4)}$$

where $$\varepsilon^*_{ij1} = \frac{\partial u^*_{ij}}{\partial y_1}$$

The distortion at one point inside and on the boundary of the disk body S can be numerically analyzed by discretizing the boundary integral equation (4) and applying the boundary conditions (tractions and displacement values at the nodes). Specifically, the boundary is divided into N elements and the region is divided into M cells (partial regions used for discretization) in the boundary integral equation (4). This discretization can be carried out by expressing the above equation (4) as a set of these boundary elements and internal cells and, as a result, can be given by the following equation (5).

$$\lambda^*_{k1j} = \frac{\partial t^*_{ki}}{\partial y_j} \quad \text{(Equation 5)}$$

$$b_{i(x)} = 0 \quad \text{(Equation 6)}$$

Since there is no volumetric force in the first embodiment as shown in the equation (6), a term of region integration of the equation (5) can be ignored. Accordingly, if the equation (5) is rearranged and expressed in matrices, the following equation (7) can be obtained as a result.

$$\{\epsilon(y)\} = [H]\{u\} + [G]\{t\} \quad \text{(Equation 7)}$$

Here, $\{\epsilon(y)\}$ is a distortion at one arbitrary point in a region $\Omega$ or on the boundary $\Gamma$, and $\{u\}$, $\{t\}$ are node information (traction, displacement value) at node j. Further, [H], [G] are coefficients calculated from the above basic solution.

In this way, j-dimensional simultaneous linear equations can be derived, and the tractions and the displacement values at the respective nodes derived from the measured distortions are substituted into these simultaneous equations, thereby calculating the distortion value in a specified direction inside or on the boundary of the region desired to be analyzed.

Although the distortion is obtained as an analyzed physical quantity in the equation (7), the displacement may be obtained as an analyzed physical quantity. In such a case, the distortion given by the equation (4) can be expressed by a displacement difference along the longitudinal direction of the optical fiber sensor 2, and the displacement can be obtained using an equation of this displacement difference.

Figure 5:
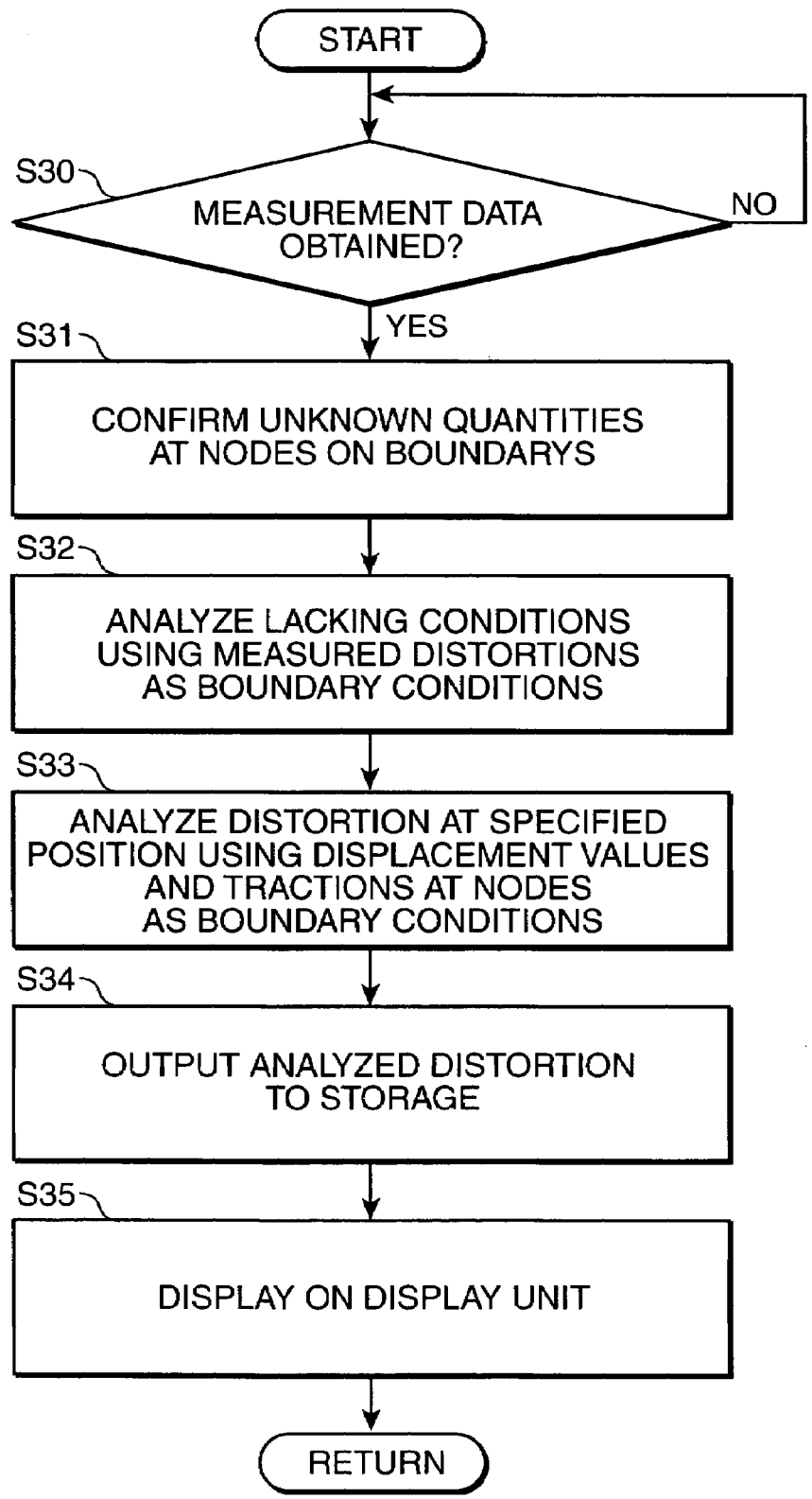
FIG. 5 is a flow chart showing an analysis processing of the numerical analyzer in the structure monitor system.

The numerical analysis method described above can be applied to the first embodiment as follows. FIG. 5 is a flow chart showing the analysis processing in the numerical analyzer 5.

Upon starting the analysis processing, whether or not the measurement data that is a data on the measured distortion, the place of measurement and the like has been inputted from the inputting device 8 is judged (Step S30).

The analysis processing waits on standby if no measurement data has been inputted (NO in Step S30), whereas unknown ones of the tractions and the displacement values at all the nodes are confirmed (Step S31) if the measurement data has been inputted. Specifically, lacking boundary conditions, i.e. the tractions or the displacement values that are not given as the initial conditions out of the tractions and the displacement values at all the nodes, are set as unknown quantities.

The tractions or displacement values set as unknown quantities are calculated using the number of measured distortions corresponding to the number of unknown quantities in accordance with the above equation (7) (Step S32).

If the tractions or the displacement values set as the unknown quantities are called unknown node information, the distortions measured by the optical fiber sensor 2 are substituted into the left-hand side of the above equation (7) while the node information (tractions and displacement values) including the unknown node information is substituted into the right-hand side. In this way, equations including as many pieces of unknown node information as the unknown quantities can be derived. If these equations are set for the number of measured distortions corresponding to the number of the unknown node information, this results in the number of simultaneous equations corresponding to the number of the unknown node information. The unknown node information can be calculated by solving these simultaneous equations.

Specifically, in the first embodiment, the tractions are known, but the displacement values are unknown at the boundary $\Gamma_1$, whereas the displacement values are known, but the tractions are unknown at the boundary $\Gamma_2$. Accordingly, 2n pieces of the node information are unknown since the two-dimensional problem is dealt in this embodiment. Accordingly, if 2n distortions are measured by the optical fiber sensor 2 and 2n measured distortions and 2n pieces of the unknown node information are substituted into the above equation (7), 2n equations are derived. 2n simultaneous linear equations are solved to calculate 2n pieces of the unknown node information.

A case where n=2 is described in more detail. For example, it is thought that the displacement values at the first and second nodes are unknown as shown in FIG. 6. At this time, since the displacement values of directions 1, 2 are both unknown, the number of the unknown node information are four: $u^1_j$ (displacement value in j-direction at the first node: where j=1, 2) and $u^2_j$ (displacement value in j-direction at the second node: where j=1, 2). On the other hand, distortions (known quantities $\epsilon_A$, $\epsilon_B$, $\epsilon_C$, $\epsilon_D$) are measured at measurement points A, B, C, D by the optical fiber sensor 2 arranged on the disk body S. The pieces of the node information at the nodes including these unknown quantities are substituted into the right side of the equation (7) and the known quantities $\epsilon_A$, $\epsilon_B$, $\epsilon_C$, $\epsilon_D$ are substituted into the left side of the equation (7). Then, four-dimensional simultaneous linear equations having four pieces of unknown information ($u^1_1$, $u^1_2$, $u^2_1$, $u^2_2$) can be derived. In this way, the displacement values (derived displacement values) as the unknown node information can be derived. This also holds in the case that the unknown node information represents the tractions or a mixture of the tractions and the displacement values.

Upon proceeding to Step S33, the distortion at a specified point on the disk body S is analyzed in accordance with the equation (7) using the derived node information and the known node information as the boundary conditions, and this is repeated for the respective analysis points, whereby a desired number of analyzed distortions in the disk body S can be obtained.

Specifically, since all the pieces of the node information were obtained in Step S32, the right side of the equation (7) is a constant at an arbitrary point y (coordinates) of the disk body S, whereby the distortion (analyzed distortion) at point y can be analyzed.

Subsequently, the analyzed distortions calculated in Step S33 and the coordinates of the analysis points are saved in the storage 51 while being related to each other. The analyzed distortions and the coordinates of the analysis points in the disk body S are displayed on the display unit 6 together with the measured distortions, the measurement coordinates, the derived distortions and the coordinates of the derived distortions (Step S35), and this routine ends.

According to this system, the distortions at positions of the disk body S where the optical fiber sensor 2 is laid can be measured with high precision by the measuring unit 3 including the optical fiber sensor 2 laid on the boundary of the disk body S.

Out of the node information (tractions, displacement values) of the disk body S, the unknown node information can be easily derived using the measured distortions by the measuring unit 3 and the equation (7) derived from the governing equation. Further, upon deriving the unknown node information, as many measured distortions by the measuring unit 3 as the pieces of the unknown node information are necessary. Since the measured distortions are obtained using the optical fiber sensor 2, a multitude of measured distortions can be obtained. Thus, an undesirable situation where the unknown node information cannot be derived due to lack of the measured distortions can be avoided.

As described above, all the pieces of the node information can be derived without fail by the numerical analyzer 5, and a distortion (analyzed distortion) at an arbitrary point of the disk body S inside or on the boundary of the disk body S where the optical fiber sensor 2 is not laid can be calculated by the boundary element method using all the pieces of the node information as the boundary conditions.

The points where the analyzed distortions were calculated (analysis points) are set beforehand, and can be related to the analyzed distortions. Accordingly, the analyzed distortions and the positions of the structure S can be related to each other by relating the analyzed distortions and the analysis points to each other, and the result can be displayed on the display unit 6, thereby enabling the distortion at every point in the disk body S to be monitored with high precision. Further, a user can easily and quickly specify a position of the structure having a specified physical quantity variation by monitoring the display unit 6. Therefore, upon a post-operation such as the repair of the structure, a minute reexamination is not required unlike with the prior art technology and the post-operation can be quickly carried out.

Second Embodiment

Figure 7A:
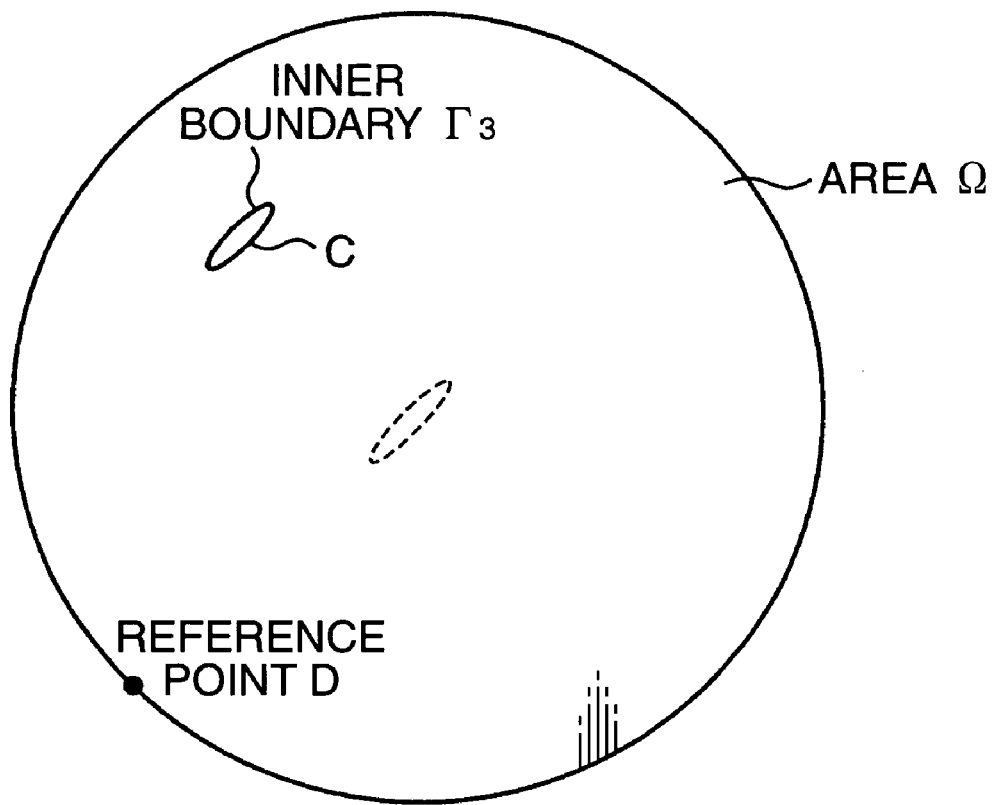
FIG. 7 is a front view showing a disk body including a crack monitored by a structure monitor system according to a second embodiment.
Figure 7B:
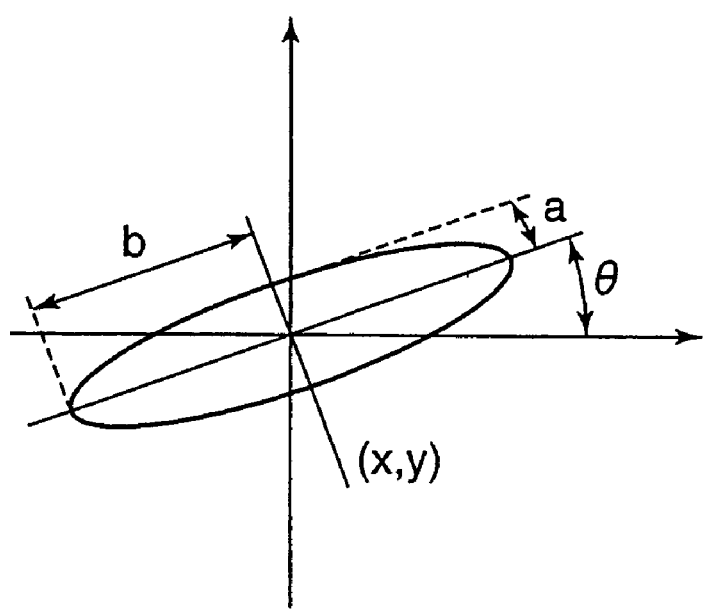

FIG. 7A is a diagram showing an object to be monitored by a structure monitor system according to a second embodiment, and FIG. 7B is a graph enlargedly showing an inner crack of this monitoring object.

The structure monitor system 1 of the second embodiment has a basic construction common to the structure monitor system of the first embodiment, but differs from the first embodiment in that a numerical analyzer 5 is so constructed as to be able to specify the position and shape of a crack C in the case that the crack C is created in the disk body S as an object to be analyzed.

Specifically, the numerical analyzer 5 of the second embodiment is, in addition to the construction of the numerical analyzer 5 of the first embodiment, constructed such that distortions of the disk body S measured at different times at the same measurement point are compared and the crack C is recognized to have been created inside the disk body S if a variation of the measured distortion exceeds a specified permissible range. In the second embodiment, the crack C is recognized to have been created inside the disk body S if the following equation (8) is not satisfied, and the position and shape of the crack C are identified in the case of making this recognition.

$$\sum_{r=1}^{R}(\varepsilon_b^r - \varepsilon_a^r)^2 \leq A \qquad \text{(Equation 8)}$$

Here, R is a total number of measurement points; $\varepsilon_b^r$ is a measured distortion obtained by the last measurement by the optical fiber sensor 2 at the measurement point; $\varepsilon_a^r$ is a measured distortion obtained by the measurement by the optical fiber sensor 2 this time; and A is a predetermined value.

Although the measured distortions are compared by a total value obtained by adding up squares of a difference between the measured distortions for all the measurement points in the second embodiment, absolute values of differences between the distortions at the respective measurements may be compared.

The position and shape of the crack C can be identified as follows. Using a distortion at a reference point D measured by the optical fiber sensor 2 as auxiliary information and assuming the position and shape of the internally present crack C to be unknown, an optimization problem of minimizing a square sum of differences between assumed distortions analyzed by the forward analysis using a boundary element method and the measured distortions is analyzed.

This optimization problem is for obtaining parameters to be described later for minimizing a target function f, and the target function f is expressed by the following equation.

$$f = \sum_{p=1}^{P}(\varepsilon_{ij}^p - \varepsilon_{ij}'^p)^2 \qquad \text{(Equation 9)}$$

where P is the number of the reference points D, $\varepsilon'^p_{ij}$ are distortions measured at the reference points D, and $\varepsilon^p_{ij}$ are analyzed distortions at the reference points D obtained by the forward analysis using the boundary element method.

Figure 8:
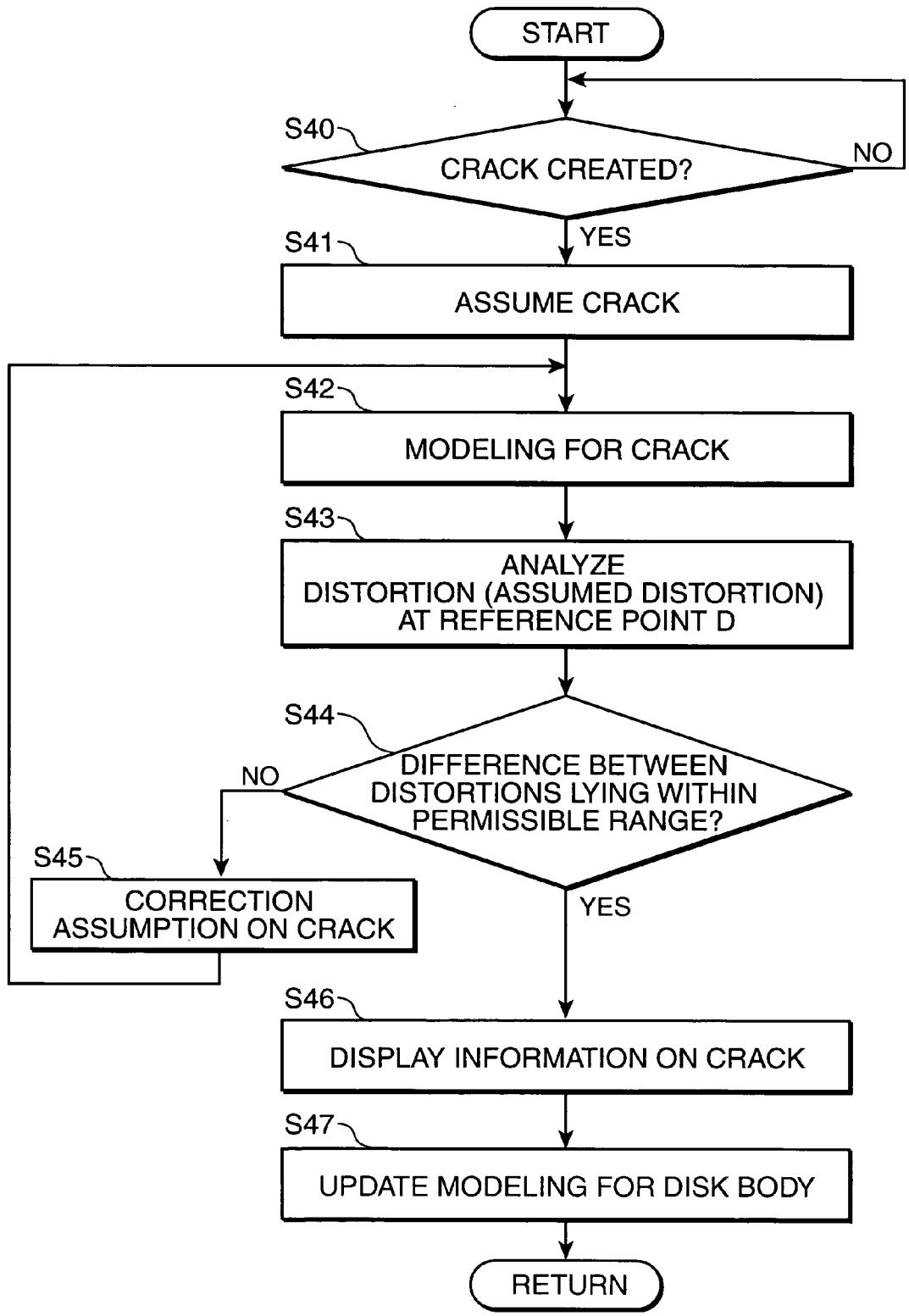
FIG. 8 is a flow chart showing an identification processing of a numerical analyzer in the structure monitor system of FIG. 7.

This identification processing is described in detail using a flow chart implemented in the numerical analyzer 5 shown in FIG. 8.

As described above, when the crack C is recognized to have been created in the numerical analyzer 5 (YES in Step S40), the shape of the crack C is approximated to an elliptical shape (including a circular shape) and the crack C is assumed in the disk body S (Step S41). There are five parameters below indicating the shape and position of the crack C.

$$\{y\} = (x, y, a, b, \theta)^T \qquad \text{(Equation 10)}$$

where x, y represent center coordinates of an ellipse, a, b represent a minor axis and a major axis of this ellipse, and θ is an angle formed between the major axis and a first axis. It should be noted that x is a coordinate along first-axis direction and y is a coordinate along second-axis direction.

Here, the crack C (shown in dotted line in FIG. 7A) is assumed to be located at a predetermined specified position of the disk body S (center of the disk body S in the second embodiment), and the major axis "a", the minor axis "b" and the angle "θ" are assumed to take predetermined specified values.

Subsequently, the assumed crack C is modeled (Step S42). Specifically, the crack C is defined as an inner boundary $\Gamma_3$, which is divided into elements (and meshes), and a plurality of new unknown nodes are provided on the inner boundary $\Gamma_3$. Although these nodes can be arbitrarily set on the inner boundary, it is preferable to set them at smaller intervals near the opposite ends along a direction of the major axis.

The modeling for the crack C, i.e. the division into the elements and the arrangement of the nodes in the crack C may be automatically carried out by the numerical analyzer 5 or may be manually carried out via the setting/inputting device 9. In the case of manual modeling, an indication urging the input for the modeling of the crack C may be, for example, made on the display unit 6.

Using the initial boundary condition that the traction is zero for the nodes provided on the inner boundary $\Gamma_3$ and the tractions and displacement values at the nodes on the external boundary $\Gamma$ of the disk body S, distortions $\epsilon^P_{ij}$ (assumed distortions) at the reference points D are analyzed in accordance with the equation (7) as in the first embodiment (Step S43).

On the other hand, the distortions $\epsilon^{tp}_{ij}$ are measured for the reference points D by the measuring unit 3, and whether or not differences (absolute value of the difference) between the measured distortion $\epsilon^{tp}_{ij}$ and the assumed distortion $\epsilon^P_{ij}$ lie within a range of a permissible range B is judged in the numerical analyzer 3 (Step S44). Unless the difference between the two distortions lies within the range of the permissible value B (NO in Step S44), the assumption of the crack C is repeatedly corrected (Step S45) until this difference comes to lie within the range of the permissible value B. Here, a known optimization method for obtaining optimal parameters to minimize the target function f is adopted for this correction of the assumption. For example, a genetic algorithm method is used as such an optimization method.

If the difference between the measured distortion $\epsilon^{tp}_{ij}$ and the assumed distortion $\epsilon^P_{ij}$ is judged to lie within the range of the permissible value B (YES in Step S44), the center (x,y), the minor axis "a", the major axis "b" and the angle "θ" of the crack C approximated to an elliptical shape are determined, i.e. the position and shape of the crack C are determined, and this information on the crack C is displayed on the display unit 6 while being related to the shape of the disk body S (Step S46). Thereafter, the position and shape of the crack C are added to the shape of the disk body S (Step S47), and the distortion distribution of the disk body S is monitored based on this new shape substantially in the same manner as in the first embodiment.

According to the structure monitor system 1 of the second embodiment, the position and shape of the crack C newly created in the disk body S can be estimated with high precision. Further, after the creation of the crack C is recognized and the position and shape of the crack C are specified, the shape of the disk body S can be automatically corrected to the shape including the newly created crack C by the numerical analyzer 5 of the second embodiment. Accordingly, the analyzed distortions can be calculated in consideration of the crack C thereafter upon monitoring the distortions similar to the first embodiment, wherefore the disk body S can be monitored with higher precision. Further, since the size of the crack and the like can also be specified, the need to repair can be judged based on this size and the like. Therefore, more efficient structure monitoring can be carried out.

Although the numerical analyzer 5 automatically adds the shape of the crack C to the shape of the disk body S after the crack C is specified in the second embodiment, the shape of the disk body S may be manually reset.

Further, although the measurement points of the optical fiber sensor 2 are used as the reference points to compare the measured distortions and the assumed distortions in the second embodiment, points where the optical fiber sensor 2 is not laid may also be, for example, used as the reference positions. In such a case, analyzed distortions at the reference points are calculated using the distortions measured by the optical fiber sensor 2, and the analyzed distortions and the assumed distortions are compared.

Third Embodiment

Figure 9:
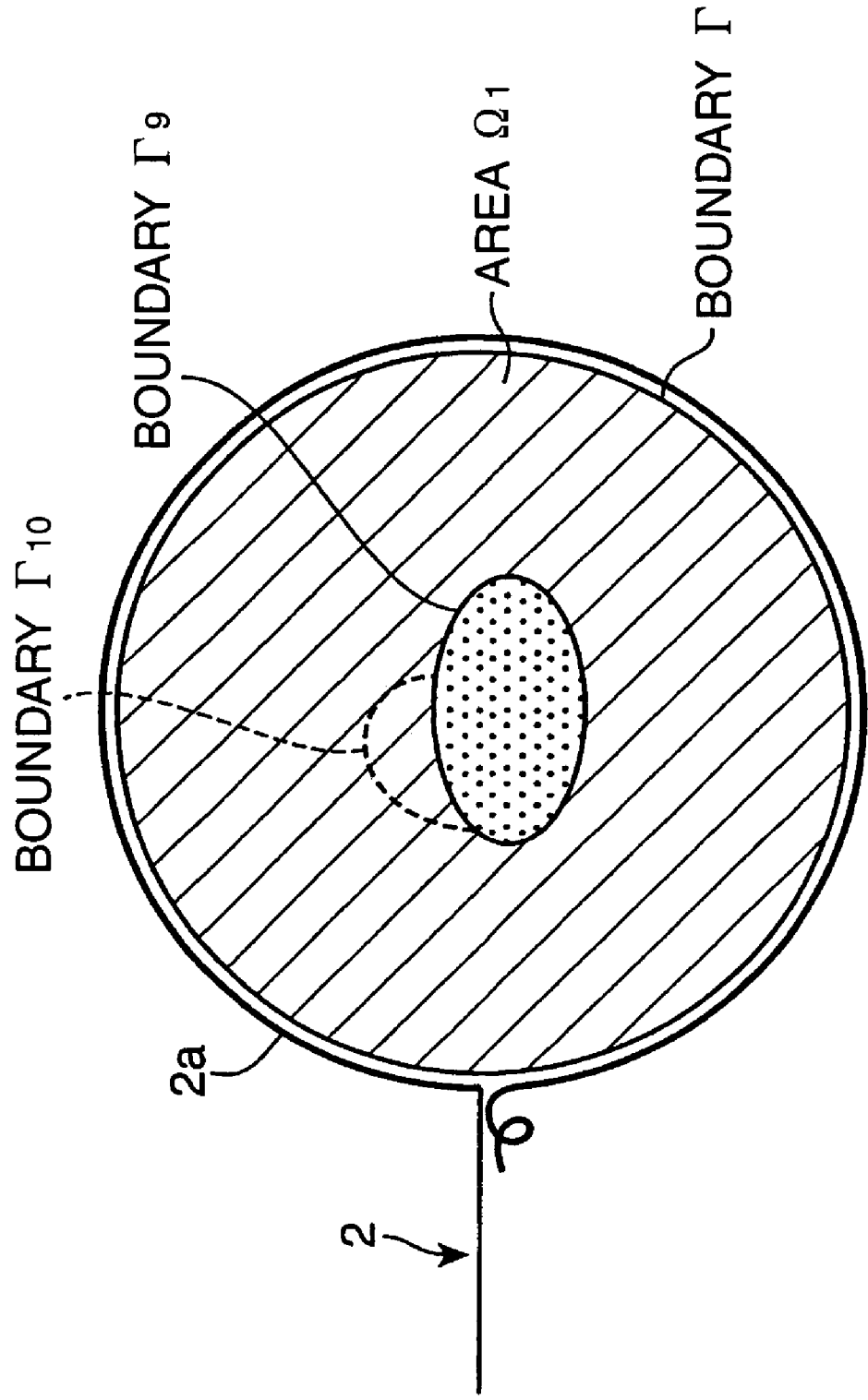
FIG. 9 is a section showing a hollow cylindrical body monitored by a structure monitor system according to a third embodiment.

A structure monitor system 1 according to a third embodiment has a basic construction common to the structure monitor system of the second embodiment, but differs from the second embodiment in that an object to be monitored is not a distortion distribution, but a temperature distribution, and that an object to be identified is not a crack, but an abnormally high temperature part. The shape of a structure S also differs. This structure S is constructed as a round tubular body as shown in FIG. 9 and is filled with a high-temperature fluid, and an inner wall thereof may be damaged or broken due to this high-temperature fluid. Accordingly, the structure monitor system 1 of the third embodiment is designed to monitor the wall thickness of the tubular body in accordance with a temperature distribution of the round tubular body as the structure S.

Although a measuring unit 3 is similar to those of the foregoing embodiments in basic construction, it is constructed as follows due to a different object to be monitored. Specifically, an optical fiber sensor 2 of the measuring unit 3 has a physical quantity detecting section 2a thereof fixed to the outer peripheral edge of the disk body S in such a manner as to wind it around, and an insulating material covers the physical quantity detecting section 2a from above. The influence of an outer temperature is reduced by covering the outer side of the physical quantity detecting section 2a by the insulating material.

The measuring unit 3 detects a distortion of the disk body S resulting from a temperature change by means of the optical fiber sensor 2, and measures a temperature (measured temperature) distribution on the outer peripheral edge of the disk body S based on this detection result. Since the other construction is similar to the first and second embodiments, no description is given thereon.

Using the measured temperatures by the measuring unit 3, temperatures and heat fluxes (derived physical quantities) at nodes on a boundary are derived, and a temperature distribution on the boundary of or inside the structure S can be analyzed in a numerical analyzer 5 using these derived temperatures and heat fluxes as boundary conditions.

The construction of this numerical analyzer 5 is similar to those of the respective foregoing embodiments, but a governing equation differs due to the different object to be monitored. Thus, a boundary integral equation derived from the governing equation differs. The boundary integral equation in the case that the object to be monitored is temperature is expressed by the following equation.

$$T(y) + \int_\Gamma q^*_{(x,y)} T_{(x)} d\Gamma - \int_\Gamma T^*_{(x,y)} q_{(x)} d\Gamma = \int_\Omega T^*_{(x,y)} b_{(x)} d\Omega, \quad \text{(Equation 11)}$$
$$y \in \Omega$$

where T(x) is temperature, q(x) is a heat flux, and b(x) is an equivalent heat source inside an area $\Omega$.

Further, since the boundary integral equation differs, a basic solution thereof also differs. The basic solution is expressed by the following equations.

$$T^*_{(x,y)} = \frac{1}{2\pi} \ln\left(\frac{1}{r}\right) \quad \text{(Equation 12)}$$
$$q^*_{(x,y)} = -\frac{1}{2\pi\gamma} \cdot \frac{\partial r}{\partial n}$$

where r is distance between points x and y, n is a unit normal vector at point x, and ∂r/∂n is a derivative coefficient in normal direction. It is thought that no heat source exists inside the analysis.

Temperature at one point inside or on the boundary of the structure S can be numerically analyzed by discretizing the boundary integral equation (11) and applying the boundary conditions. This discretized boundary integral equation can be expressed by the following equation.

$$\{T_{(y)}\}=[H_T]\{T\}+[G_T]\{q\} \quad \text{(Equation 13)}$$

where $\{T(y)\}$ is temperature at an arbitrary point in the area $\Omega$ or on the boundary $\Gamma$, and $\{T\}$, $\{q\}$ are temperature and heat flux at a node j. Further, $[H_T]$, $[G_T]$ are coefficients calculated form the basic solution.

Temperature at an arbitrary point in or on the structure S can be calculated by substituting the specified initial conditions and the boundary conditions of the node information based on the temperatures measured by the measuring unit 3 into the above equation (13). This calculation is repeated for a plurality of analysis points in the structure S, whereby the temperature distribution in the structure S can be analyzed. The temperature distribution of the structure S can be monitored by displaying this temperature distribution in relation to the positions of the structure S in relation to the positions of the structure S on the display unit 6.

On the other hand, similar to the second embodiment, the numerical analyzer 5 can recognize the presence of an abnormally high temperature part in the disk body S and specify the position and shape of the abnormally high temperature part by a method similar to the one of the second embodiment when a difference between temperatures measured at different times at the same measurement points exceeds a specified range. Specifically, when a high temperature part is enlarged, the numerical analyzer 5 recognizes that a part of the inner wall of the structure S is lacking and the high temperature part is enlarged due to a change in the shape of the structure S, identifies the position and shape of this enlarged high temperature part as the abnormally high temperature part, and resets the shape of the structure S based on this identification result.

Specifically, the measuring unit 3 measures the temperature (measured temperature) a plurality of times at the same measurement point. The numerical analyzer 5 compares the temperatures measured at different times at the same measurement point and recognizes the presence of the abnormally high temperature part when a difference between these temperatures exceeds a specified permissible range. Upon such recognition, the position and the shape of the abnormally high temperature part are identified in the numerical analyzer 5 as follows. Using the measured temperatures at the reference points D by the optical fiber sensor 2 as auxiliary information and assuming that the position and shape of the abnormally high temperature part present in the structure S are unknown, assumed temperatures are analyzed by the forward analysis using the boundary element method and an analysis is made as an optimization problem for minimizing a sum of squares of differences between the measured temperatures and the assumed temperatures. Since this specific method is already described in the second embodiment, only different points are described here.

Specifically, in the third embodiment, it is assumed that a boundary $\Gamma_9$ becomes a boundary $\Gamma_{10}$ as the inner wall disappears, and node coordinates on this boundary $\Gamma_{10}$ are set as parameters. Here, the number of nodes on the boundary $\Gamma_{10}$ is set via the setting/inputting device 9. For example, sixteen nodes are set. The respective nodes are set on the boundary $\Gamma_9$ or inside the area $\Omega$ and a closed region is formed by connecting the nodes of adjacent numbers and connecting the first and the last nodes. For example, in order to form the closed region by the respective nodes, the first node and the ninth node, which is a node of a number in the middle, may be set, a line segment connecting the first and ninth nodes may be divided into eight, and two upper and lower nodes may be set for each point of division.

By assuming the nodes on the boundary $\Gamma_{10}$, i.e. identifying the respective node coordinates as parameters, a new boundary $\Gamma_{10}$ can be specified.

According to the structure monitor system of the third embodiment, analyzed temperatures can be calculated for a plurality of analysis points set on the boundary of or inside the structure S beforehand. The position of the structures and the analyzed temperatures can be related to each other by relating the analysis points and the analyzed temperatures to each other, whereby the temperature distribution of the structure S can be obtained. Temperature can be monitored with high precision at every position of the structure S by displaying this temperature distribution on the display unit 6, and the position of the structure S having a specific temperature variation can be easily and quickly specified. Accordingly, upon a post-operation such as the repair of the structure, a minute reexamination is not required unlike with the prior art technology and the post-operation can be quickly carried out. Further, similar to the second embodiment, the position and shape of the abnormally high temperature part produced in the disk body S can be estimated with high precision, and the shape of the structure S can be reset based on the position and shape of this abnormally high temperature part. In this way, the abnormally high temperature part resulting from the disappearance of the inner wall or the like can be specified, and a user can judge the need for the repair based on this result.

Fourth Embodiment

A structure monitor system 1 according to a fourth embodiment has a basic construction common to the first embodiment, but differs from the first embodiment in the shape of a structure S as an object to be monitored, the arrangement of an optical fiber sensor 2 located inside the structure S and an analysis method used in a numerical analyzer 5.

Figure 10:
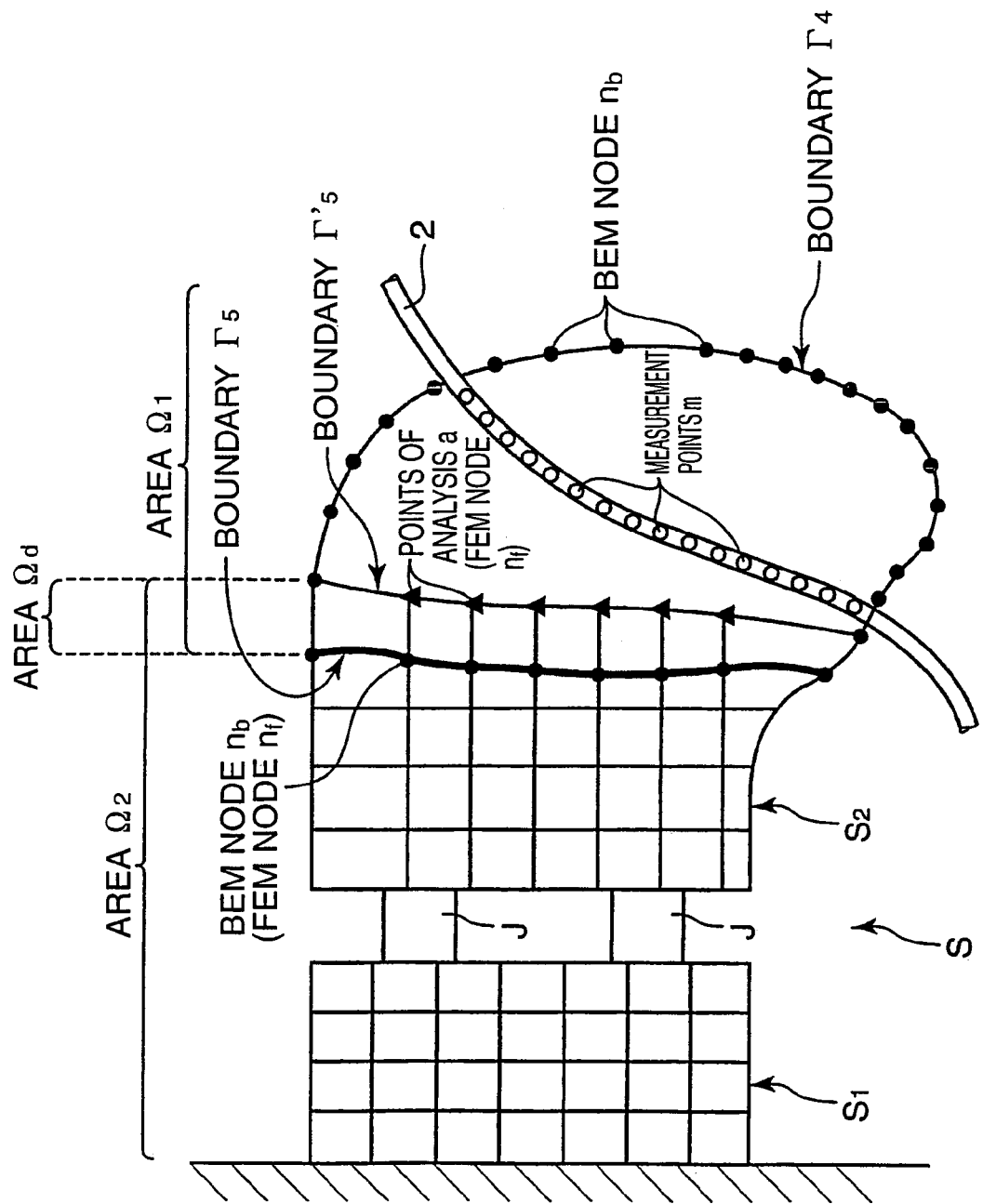
FIG. 10 is a front view showing a structure monitored by a structure monitor system according to a fourth embodiment.

Specifically, the structure S monitored by the structure monitor system 1 of the fourth embodiment is comprised of a first structure S1 having one end fixed to a fixed surface, a second structure S2 at a side of the other end of the first structure S1 and made of a material different from the first structure S1, and two coupling members J coupling the first and second structures S1, S2 as shown in FIG. 10.

The optical fiber sensor 2 is so arranged at the leading end of the second structure S2 as to cross this leading end. A measuring unit 3 is so constructed as to be able to measure the number of measured distortions corresponding to the number of unknown pieces of node information (tractions and displacement values) at nodes set at least on a boundary $\Gamma_5$ to be described later. In other words, the number of measurement points m is set to be equal to or greater than the number of pieces of unknown node information at nodes $n_b$ at least on the boundary.

The numerical analysis method adopted in the numerical analyzer 5 according to the first embodiment can flexibly deal with a change in the shape of the structure as an object to be monitored due to, for example, the creation of a crack but, on the other hand, has difficulty in analyzing, for example, because it is difficult to set boundary conditions and the like around the coupling members J (e.g., screw, rivet) due to the fact that the shape and receiving pressure of the coupling members J are complicated if the structures S1, S2 made of a plurality of different materials are coupled by the couplings members J as in the structure S shown in FIG. 10. Thus, this numerical analysis method is thought to have efficiency and precision problems in monitoring the first structure S1 and the coupling members J.

Accordingly, in the structure monitor system 1 according to the fourth embodiment, analysis is carried in the numerical analyzer 5 by combining the numerical analysis method according to the first embodiment and a finite element method. Specifically, the numerical analyzer 5 is so constructed as to divide the structure S into an area $\Omega_1$ and an area $\Omega_2$ partially overlapping each other, to calculate distortions (analyzed distortions) inside or on the boundary of the area $\Omega_1$ by the numerical analysis method of the first embodiment and to calculate distortions inside or on the boundary of the area $\Omega_2$ by the finite element method.

Figure 11:
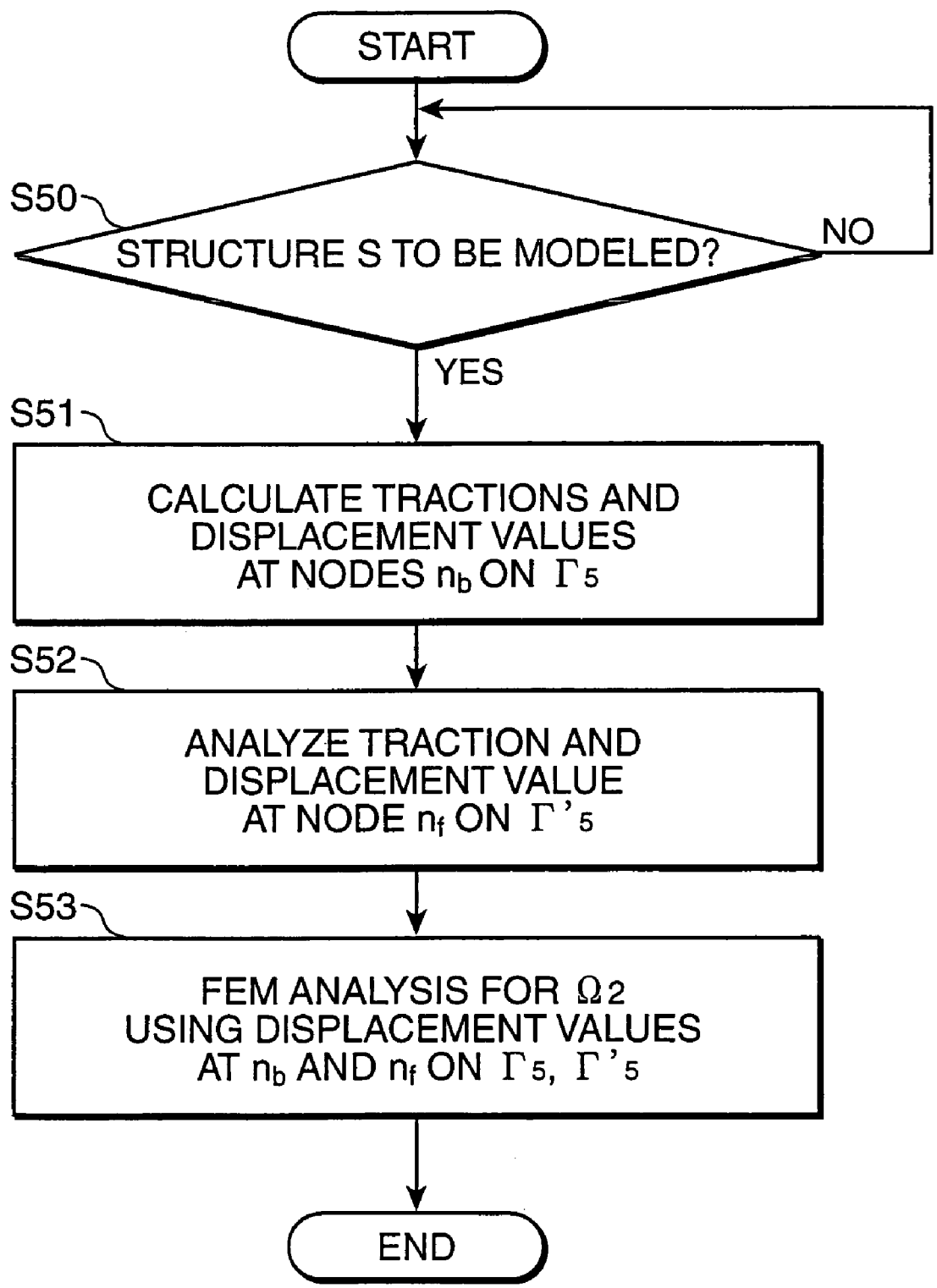
FIG. 11 is a flow chart showing an analysis processing of a numerical analyzer of the structure monitor system.

This analysis processing is described in detail with reference to a flow chart of FIG. 11 implemented in the numerical analyzer 5.

Specifically, information on the modeling for the structure S is first received by a setting/inputting device 9 (Step S50). Upon this modeling, the structure S is specifically divided into the areas $\Omega_1$, $\Omega_2$ partially overlapping each other, wherein the boundary of the structure S is divided into a plurality of linear elements and one node $n_b$ is set for each element in the area $\Omega_1$ and, on the other hand, an inner area is divided into a plurality of rectangular area elements and one node $n_f$ is set for each of points where the corners of the respective elements meet in the area $\Omega_2$. Here, if it is assumed that a boundary of an overlapping area $\Omega_d$ where the areas $\Omega_1$, $\Omega_2$ partially overlap at the side of the area $\Omega_2$ (boundary of the area $\Omega_1$) is a boundary $\Gamma_5$ and a boundary thereof at the side of the area $\Omega_1$ is a boundary $\Gamma'_5$ (boundary of the area $\Omega_2$), the nodes $n_b$, $n_f$ of the areas $\Omega_1$, $\Omega_2$ are set to overlap on the boundary $\Gamma_5$.

Tractions $s_t$ are zero at the nodes $n_b$ on a boundary $\Gamma_4$; node information (both tractions and displacement values) are unknown at the nodes $n_b$ on the boundary $\Gamma_5$; and these pieces of initial setting information are inputted via the setting/inputting device 9.

Subsequently, the pieces of the node information at the nodes $n_b$ on the boundary $\Gamma_5$ set to be unknown by the above initial setting are calculated using the optical fiber sensor 2 (Step S51). Specifically, since the traction and the displacement value at each node $n_b$ on the boundary $\Gamma_5$ are both unknown with respect to first and second directions, the number of unknown quantities are four times the number of the nodes $n_b$ on the boundary $\Gamma_5$, and distortions at the measurement points m corresponding to this number are measured in the measuring unit 3. Simultaneous equations are derived by substituting the measured distortions by the measuring unit 3 into the above equation (7). All the pieces of the unknown node information (tractions and displacement values) are calculated by solving these simultaneous equations.

Since the tractions and the displacement values at the nodes $n_b$ on the boundary $\Gamma_5$ could be calculated, a distortion at an arbitrary point on the boundary of or inside the area $\Omega_1$ can be similarly analyzed as in the first embodiment. Then, the tractions and the displacement values at the nodes $n_f$ on the area $\Gamma'_5$ are calculated (Step S52) and, out of the calculation results, only the displacement values are used for the analysis in the area $\Omega_2$ to be described later.

On the other hand, in the area $\Omega_2$, the analyzed distortions inside or on the boundary are calculated by the finite element method using the displacement values at the nodes $n_f$ on the area $\Gamma'_5$ calculated as above and the displacement values at the nodes $n_f$ on the boundary $\Gamma_5$ set to overlap the nodes $n_b$ of the area $\Omega_1$ as boundary conditions (Step S53). Since the numerical analysis technique by the finite element method is known and a multitude of application softwares are commercially available, no description is given thereon here. If attention is paid to a section between the boundaries, the tractions obtained by the boundary element method (BEM) never fail to coincide with the tractions obtained by converting stress fields obtained by the finite element method (FEM).

Here, since the structure as an object to be analyzed is divided into the area elements according to the finite element method, the presence of separate parts and the like made of different kinds of materials is permitted. Accordingly, analysis can be relatively easily carried out even in the case that there are complicated coupling conditions as in the area $\Omega_2$ including the first and second structures S1, S2 and the coupling members J.

In the fourth embodiment as well, if a crack is created in the area $\Omega_1$, the position and shape of this crack can be identified similar to the second embodiment.

Fifth Embodiment

A structure monitor system 1 according to a fifth embodiment has a basic construction common to the first embodiment, but differs from the first embodiment in a structure S as an object to be monitored being a tunnel and, accordingly, in boundary conditions to be inputted to a numerical analyzer 5.

Figure 12:
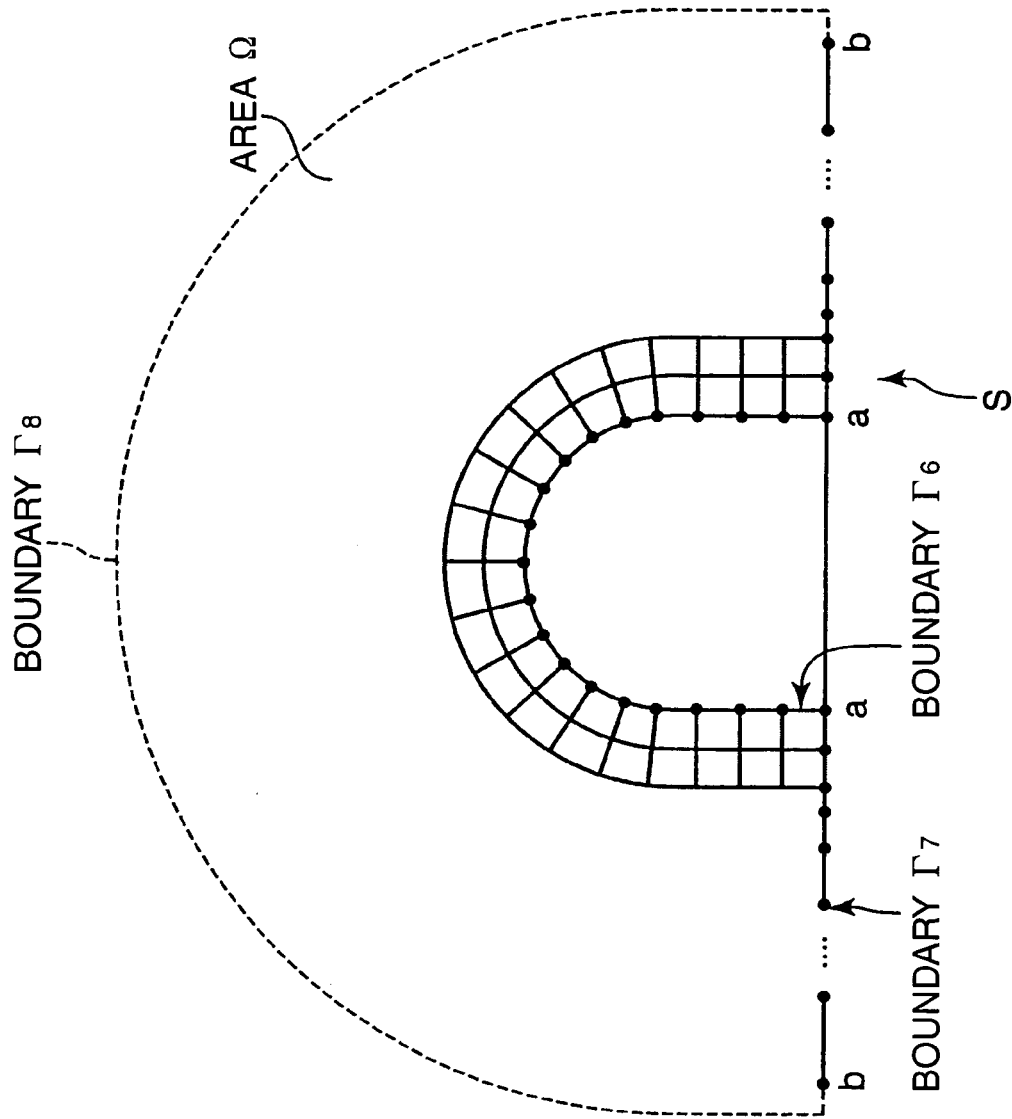
FIG. 12 is a front view showing a tunnel monitored by a structure monitor system according to a fifth embodiment.

Specifically, in the fifth embodiment, the object to be monitored is a tunnel S (more specifically, a structure forming an opening of the tunnel) as shown in FIG. 12, and the falling-off and the fall of the concrete blocks constructing the tunnel are, for example, monitored.

Thus, an optical fiber sensor 2 of a measuring unit 3 is laid along the inner wall surface (on the boundary) of the tunnel. In other words, the optical fiber sensor 2 is laid along the longitudinal direction of the tunnel from an opening at one end of the tunnel to an opening at the other end while extending back and forth along the circumferential direction of the tunnel.

In this way, if the object to be monitored is a considerably large structure such as a tunnel, how the influence of a physical quantity at a position sufficiently distant from the inner wall surface of the tunnel such as a position near the mountain surface should be dealt with is a problem. Here, since this system is for monitoring the falling-off and the like of the concrete blocks in the tunnel, it is sufficient to monitor a distortion distribution at and near the inner wall of the tunnel.

Accordingly, the structure monitor system 1 of the fifth embodiment is so constructed as to be able to monitor the distortion distribution at and near the inner wall of the tunnel with high precision by elaborating the input of initial boundary conditions to a numerical analyzer 5.

Here, it is assumed that an area $\Omega$ as an object to be analyzed of the structure S forming the opening of the tunnel is surrounded by a boundary $\Gamma_6$ that is the inner wall of the tunnel, a boundary $\Gamma_7$ that is a ground-contact portion continuous with the boundary $\Gamma_6$, and a boundary $\Gamma_8$ that is an infinite boundary continuous with the boundary. The boundary $\Gamma_8$ is assumed to be an infinite boundary for the following reason. Because a range monitored by this system 1 is at and near the boundary $\Gamma_6$ and the boundaries $\Gamma_6$, $\Gamma_8$ are sufficient distant from each other, a basic solution of the term of the boundary $\Gamma_8$ becomes zero and the term of the boundary $\Gamma_8$ can be ignored.

Then, a governing equation of the structure S can be converted into the following boundary integral equation.

$$\varepsilon_{j1} = \frac{\partial u_{j(y)}}{\partial y1} = \int_{\Gamma 6} \varepsilon^*_{ij1} t_{i(x)} d\Gamma_{(x)} + \int_{\Gamma 7} \varepsilon^*_{ij1} t_{i(x)} d\Gamma_{(x)} - \qquad \text{(Equation 14)}$$
$$\int_{\Gamma 6} \lambda^*_{ij1} u_{i(x)} d\Gamma_{(x)} - \int_{\Gamma 7} \varepsilon^*_{ij1} t_{i(x)} d\Gamma_{(x)}$$

where $$\int_{\Gamma 7} \varepsilon^*_{ij1} t_{i(x)} d\Gamma_{(x)} = \int_a^\infty \varepsilon^*_{ij1} t_i(x_1) dx_1$$

$$\int_{\Gamma 7} \varepsilon^*_{ij1} t_{i(x)} d\Gamma_{(x)} = \int_a^b \varepsilon^*_{ij1} t_i(x_1) dx_1$$

$$= \sum_{m=1}^{M} \varepsilon^*_{ij1}(m) t_i(m)(x_{1m} - x_{1m-1})$$

In the above equation (14), it is clear that only vertical components exist in both displacement values and tractions in the term of integration concerning the boundary $\Gamma_7$ since the boundary $\Gamma_7$ is in contact with the ground. A traction distribution on this boundary $\Gamma_7$ can be easily obtained since the boundary $\Gamma_7$ is expressed by straight line. Specifically, as shown in FIG. 12, point "b" sufficiently distant from point "a" on the boundary $\Gamma_7$ is set; intervals between adjacent ones of m nodes between points "a" and "b" are set to gradually widen; and tractions and displacement values between points "a" and "b" as unknown quantities can be obtained together with unknown quantities on the boundary $\Gamma_6$ using the fact that a basic solution on the boundary greater than point "b" becomes sufficiently smaller.

Accordingly, the following equation is obtained by rearranging the above equation (14) and displaying it in matrix.

$$\{\varepsilon_{(y)}\} = [H_1] \begin{Bmatrix} u_{\Gamma 6} \\ u_m \end{Bmatrix} + [G_1] \begin{Bmatrix} t_{\Gamma 6} \\ t_m \end{Bmatrix} \qquad \text{(Equation 15)}$$

Here, $\{\varepsilon(y)\}$ denotes a distortion at one arbitrary point in the area $\Omega$ or on the boundary $\Gamma$; $\{u_{\Gamma 6}\}$, $\{t_{\Gamma 6}\}$ denote node information (traction, displacement value) at the node on the boundary $\Gamma_6$; and $[H_1]$, $[G_1]$ denote coefficients calculated from the basic solution.

The above equation (15) is saved in the numerical analyzer 5, to which initial conditions such as an initial boundary condition (displacement values are zero) on the boundary $\Gamma_7$ are inputted from the setting/inputting device 9 and to which the measured distortions concerning the boundary $\Gamma_6$ measured by the optical fiber sensor 2 are inputted from the inputting device 8. Under these conditions, the numerical analyzer 5 can analyze a distortion (analyzed distortion) at an arbitrary point on the boundary $\Gamma_6$ of the structure S or in the inner area near the boundary $\Gamma_6$.

In this way, the unknown boundary condition on the boundary $\Gamma_8$ of the boundary integral equation in the numerical analyzer 5 can be supplemented. Even for a fairly large structure such as a tunnel, the inner circumferential wall of the tunnel and the vicinity thereof can be monitored with high precision, thereby broadening its application range.

Sixth Embodiment

A structure monitor system 1 according to a sixth embodiment has a basic construction common to the first embodiment, but differs from the first embodiment in that a confirmation optical fiber sensor 200 for confirming the precision of an analyzed distortion by a numerical analyzer 5 is laid in addition to an optical fiber sensor 2 for measuring distortions as boundary conditions. It should be noted that the shape of a structure as an object to be monitored in the sixth embodiment also differs from that of the first embodiment.

Figure 13:
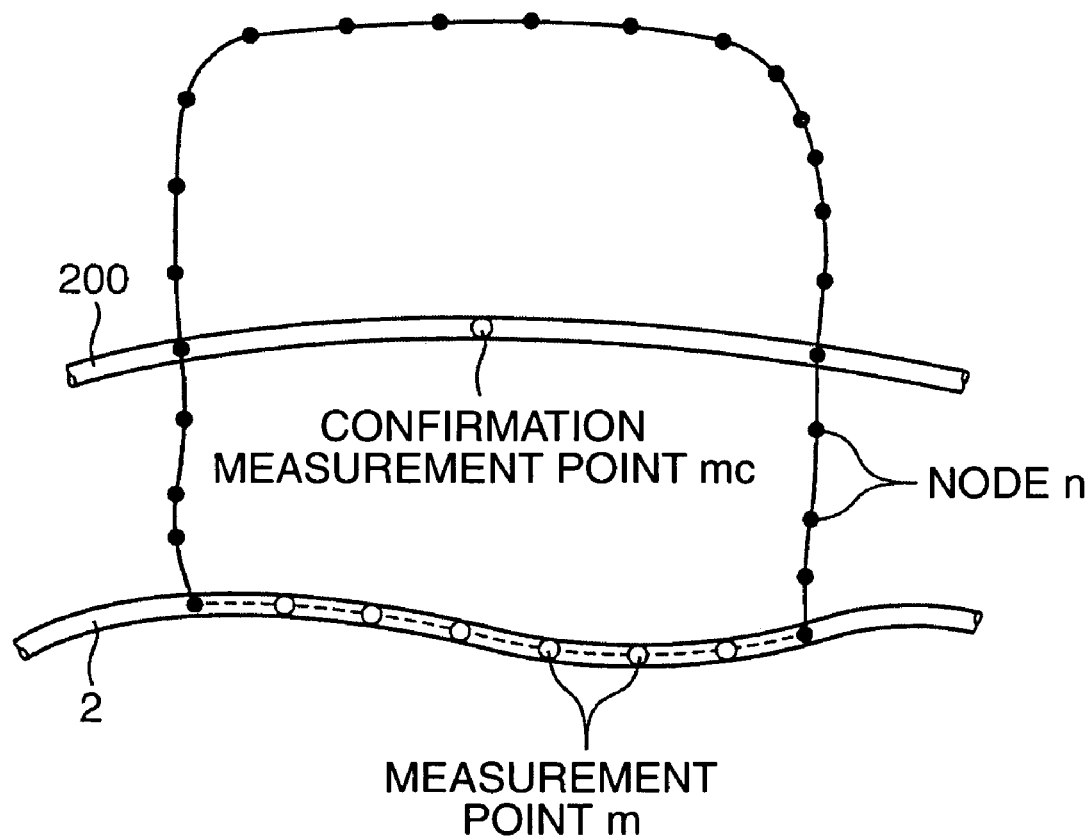
FIG. 13 is a front view showing an arrangement mode of an optical fiber sensor in a structure monitored by a structure monitor system according to a sixth embodiment.

Specifically, the structure S is a substantially rectangular plate-shaped body as shown in FIG. 13. The optical fiber sensor 2 of a measuring unit 3 is fixed along one peripheral edge of this structure S and so constructed as to be able to measure a plurality of distortions by means of a physical quantity detector 2a, which is this fixed section of the optical fiber sensor 2. Similar to the first embodiment, in this structure monitor system 1, a distortion (analyzed distortion) at an arbitrary point on a boundary of or inside the structure S can be analyzed by the numerical analyzer 5 using these measured distortions.

On the other hand, the confirmation optical fiber sensor 200 is laid in parallel with the optical fiber sensor 2 in the middle of this structure S. A confirmation measurement point $m_c$ is set beforehand on this conformation optical fiber sensor 200, and a Brillouin scattered light at this confirmation measurement point $m_c$ is received by the measuring unit 3, and a measured distortion at the confirmation measurement point $m_c$ can be calculated based on the spectrum of the received light. This measured distortion is outputted from the measuring unit 3 to the numerical analyzer 5 together with the coordinates of the confirmation measurement point $m_c$.

The numerical analyzer 5 calculates an analyzed distortion at the confirmation measurement point $m_c$ based on the measured distortions from the optical fiber sensor 2 and compares this analyzed distortion at the confirmation measurement point $m_c$ and the measured distortion measured at the confirmation measurement point $m_c$ by the confirmation optical fiber sensor 200.

FIG. 14 is a flow chart showing an analysis processing carried out in the numerical analyzer 5. This analysis processing is described in detail with reference to FIG. 14.

Upon starting the analysis processing, whether or not the measurement data (measured distortions, coordinates of measurement points) by the optical fiber sensor 2 have been already obtained is confirmed (Step S60) similar to the first embodiment. Then, whether or not the measurement data (measured distortion at confirmation measurement point $m_c$, and coordinates of the confirmation measurement point $m_c$) by the confirmation optical fiber sensor 200 have been already obtained is confirmed (Step S61). If both measurement data have been already obtained, the analyzed distortion at the confirmation measurement point $m_c$ is calculated using the measurement data by the optical fiber sensor 2 (Step S62). Since this numerical analysis method is same as in the first embodiment, no description is given here.

Subsequently, the numerical analyzer 5 compares the measured distortion and the analyzed distortion at the confirmation measurement point $m_c$ (Step S63) and judges whether an error (difference between the analyzed distortion and the measured distortion) lies within a predetermined permissible range (Step S64). Here, these two distortions may be compared using the square of the difference between the two distortions or using an absolute value of the difference between the two distortions. A predetermined value that serves as a basis in judging whether or not the error lies within the permissible range is inputted beforehand by means of the setting/inputting device 9. A plurality of predetermined values may be set depending on the monitoring level.

If the error lies within the permissible range (YES in Step S64), the measurement data saved in a storage 51 is updated (Step S65) and a distortion distribution is displayed on the display unit 6, thereby ending the analysis processing.

On the other hand, if the error between the analyzed distortion and the analyzed distortion at the confirmation measurement point $m_c$ exceeds the permissible range (NO in Step S64), notification that the error exceeds the permissible range and this error are displayed on the display unit 6 (Step S67), whereupon the modeling of the structure S is reset. Specifically, the resetting of the modeling includes, for example, changes in the number of nodes and the coordinates of the nodes in the structure S and the resetting of the division into the boundary elements. In the sixth embodiment, it is set to change the coordinates of the nodes. Thereafter, a signal instructing the re-measurement at a specified measurement point m of the structure S is outputted to the measuring unit 3 (Step S69), proceeding to Step S60.

According to the structure monitor system 1 of the sixth embodiment, the estimation precision of the analyzed distortion by the numerical analyzer 5 can be confirmed through the comparison with the measured distortion by the confirmation optical fiber sensor 200, whereby the precision of the modeling, the initial setting and the like can be confirmed and the precision can be improved by resetting this modeling and the like. Thus, the distortion distribution of the structure S can be estimated with high precision and a part that is largely distorted and likely to be damaged can be specified with high precision and quickly repaired.

In the sixth embodiment, the modeling of the structure S is reset if the error exceeds the permissible range. This error may result from a new crack created in the structure S. Accordingly, instead of resetting the modeling of the structure S or if the error still exceeds the permissible range despite a plurality of attempts to reset the modeling, the crack may be recognized and the position and shape of this crack may be identified as in the second embodiment.

Although the confirmation optical fiber sensor 200 is provided separately from the optical fiber sensor in the sixth embodiment, the optical fiber sensor 2 may be caused to possess this function. In such a case, the optical fiber sensor 2 is provided with a confirmation measurement point different from the measurement points for the measured distortions used to calculate the analyzed distortion, and the measured distortion at this confirmation measurement point is to be compared.

Further, in the sixth embodiment, the optical fiber sensor is used and the measured distortions are calculated in the measuring unit using this optical fiber sensor in order to confirm the precision of the analyzed distortion. The measured distortion for confirmation may be, for example, obtained using a known measuring means such as a distortion sensor.

Seventh Embodiment

A structure monitor system 1 according to a seventh embodiment has a basic construction common to the first embodiment, but differs from the first embodiment in that a display unit is connected with a control unit via a wireless circuit or an Internet circuit.

FIG. 15 is a construction diagram showing the structure monitor system 1 according to the seventh embodiment.

As shown in FIG. 15, this structure monitor system 1 is provided with a control unit 4 having a communicator 14, a display unit 6 connected with the controller 4 via a wire circuit, a first remote display unit 12 connected with the control unit 6 via a network system 11, and a second remote display unit 13 communicating with the control unit 4 via communicators 14, 15.

The first remote display unit 12 includes a modem in addition to a construction similar to the display unit 6, and receives information outputted from the control unit 4 via the network system 11 such as Internet by means of the modem. This information from the control unit includes, for example, information on an analyzed distortion, coordinates of an analysis point, and the shape of a structure S. The first remote display unit 12 possesses a function as a monitoring unit 10 while displaying the received information in the form of figures, characters or the like on its screen, and gives a corresponding notification to a user if the analyzed distortion exceeds a predetermined value.

The second remote display unit 13 includes the communicator 15 in addition to a construction similar to the display unit 6. By means of this communicator 15, the second remote display unit 13 catches an electromagnetic wave as a carrier wave transmitted from the control unit 4, extracts a communication signal from the electromagnetic wave, converts it into an electrical signal, and displays a distortion distribution in the structure S as an image based on this electrical signal.

By the first and second remote display units 12, 13, the analyzed physical quantity can be obtained regardless of an installation place of the numerical analyzer 5.

Other Embodiments

The embodiments of the structure monitor system are described above. The structure monitor system according to the present invention is not limited to the foregoing embodiments, and various changes can be made without departing from the scope and spirit of the present invention. For example, the following modifications can be made.

(1) Although the distortion or temperature is analyzed as a physical quantity in the structure monitor systems 1 according to the foregoing embodiments, the physical quantity to be analyzed is not limited thereto. For example, the physical quantity may be a magnetic field, the propagation of a sound wave or the like, a flow, a displacement, a traction or the like.

In such a case, Laplace equations, Poisson equations, Helmholtz equations or the like are used as governing equations of the respective physical quantities.

Depending on the physical quantity to be analyzed, the optical fiber sensor is improved to measure the respective physical quantities. For example, if the object to be monitored is a magnetic field, the optical fiber sensor is coated with a magnetically distortable member that is deformed according to a magnetic force. Since the optical fiber sensor is deformed according to the magnetic force in this case, the magnetic field can be calculated in the measuring unit using this optical fiber sensor.

(2) Although the structure is seen as a plane and handled as a two-dimensional problem in the structure monitor systems 1 according to the foregoing embodiments, it can be also seen as a solid body and handled as a three-dimensional problem. In such a case, the basic solution and the modeling of the structure such as the division into boundary elements and the arrangement of the nodes differ, but they are known as the boundary element method and, hence, no description is given here.

(3) Although a change of the physical quantity in the entire structure is monitored by the structure monitor system 1 in the foregoing embodiment, the monitoring range is not limited to the entirety of the structure and may be a part of the structure.

In such a case, the monitoring range (analysis range) is specified by means of the setting/inputting device 9.

(4) The numerical analysis method carried out in the numerical analyzer 5 is not limited to those described in the foregoing embodiment. This method may be another known numerical analysis method such as a finite element method provided that boundary conditions are set and a numerical analysis is made using these boundary conditions.

As described above, a structure monitor system for analyzing a physical quantity including a temperature, a distortion or the like at a specified point of a structure, in which the physical quantity at one point on a boundary or inside the structure is expressed by a governing equation, by a numerical analysis method by setting a specific boundary condition, and monitoring the structure based on the analysis result, comprises a measuring means for, using an optical fiber sensor laid on the boundary of the structure, measuring physical quantities of the structure at points on the boundary of the structure where the optical fiber sensor is laid; a numerically analyzing means for calculating the physical quantity at the specified point of the structure by the numerical analysis method using the measured physical quantities by the measuring means as the boundary condition; and a display means for displaying information on the analyzed physical quantity by the numerical analyzing means in relation to the position of the structure.

With this construction, the temperature, the distortion or the like physical quantity at a position where the optical fiber sensor is laid can be measured with high precision by the measuring means including the optical fiber sensor laid on the boundary of the structure. Further, in the numerically analyzing means, the physical quantity at the specified point of the structure in which the physical quantity at an arbitrary point on the boundary or inside is expressed by the governing equation can be calculated and estimated by solving the governing equation by a specified numerical analysis method using the measured physical quantities by the measuring means as the boundary condition. Furthermore, since the display means is provided to display the analyzed physical quantity at the specified point of the structure in relation to the position of the structure, the physical quantity at every position of the structure can be monitored with high precision, and a part of the structure where a change in the physical quantity has been a specific value or greater can be easily and quickly specified. Therefore, unlike the prior art technology, no minute reexamination is required upon a post-operation such as the repair of the structure, and the post-operation can be quickly dealt with.

Also, a structure monitor system for analyzing a physical quantity including a temperature, a distortion or the like at a specified point of a structure, in which the physical quantity at one point on a boundary or inside the structure is expressed by a governing equation, by a numerical analysis method by setting a specific boundary condition, and monitoring the structure based on the analysis result, comprises a measuring means for, using an optical fiber sensor laid at least either on the boundary of the structure or inside the structure, measuring the physical quantity of the structure at points on a part where the optical fiber sensor is laid; a numerically analyzing means for deriving physical quantities at points on the boundary of the structure where the optical fiber sensor is not laid, which physical quantities are converted for the input as the boundary condition, from the governing equation using the measured physical quantities by the measuring means, and calculating an analyzed physical quantity at a specified point of the structure by the numerical analysis method using at least either the derived physical quantities or the measured physical quantities on the boundary as the boundary condition; and a display means for displaying information on the analyzed physical quantity by the numerically analyzing means in relation to the position of the structure.

With this construction, the physical quantity such as the temperature, the distortion or the like at a position where the optical fiber sensor is laid can be measured with high precision by the measuring means including the optical fiber sensor laid at least either on the boundary of the structure or inside the structure. Further, in the numerically analyzing means, the physical quantities at the respective points of the structure where the optical fiber sensor is not laid (physical quantities at the respective points on the boundary of the structure where the optical fiber sensor is not laid, which physical quantities are converted for the input as the boundary condition) are derived from the governing equation using the measured physical quantities by the measuring means. Thus, the optical fiber sensor can be relatively freely laid without being restricted to the boundary of the structure, wherefore the optical fiber sensor can be more easily laid. Further, in the numerically analyzing means, the physical quantity at a specified point of the structure in which the physical quantity at an arbitrary point on the boundary or inside of the structure is expressed by the governing equation can be calculated and estimated by solving the governing equation by a specified numerical analysis method using the measured physical quantities by the measuring means and the derived physical quantities (physical quantities of a kind different from the above measured physical quantities) by the numerically analyzing means as the boundary condition. Further, since the display means is provided to display the analyzed physical quantity by the numerically analyzing means in relation to the position of the structure, the physical quantity at every position of the structure can be monitored with high precision and the position of the structure experiencing a specific change in the physical quantity can be easily and quickly specified. Therefore, unlike the prior art technology, no minute reexamination is required upon a post-operation such as the repair of the structure, and the post-operation can be quickly dealt with.

Preferably, the above structure monitor system may be further provided with a notifying means for giving a notification if the analyzed physical quantity by the numerically analyzing means exceeds a predetermined physical quantity.

With this construction, if the structure has a position where the physical quantity exceeds a predetermined physical quantity, a person who is monitoring can find this situation in an instant. For example, if the predetermined physical quantity is set at a limit value of a normal range in the structure, the person who is monitoring can find an abnormality in the structure in an instant.

In the above structure monitor system, the optical fiber sensor may be preferably laid on the outer surface of the structure.

With this construction, the optical fiber sensor can be easily laid and exchanged.

In the above structure monitor system, the numerically analyzing means may preferably calculate the analyzed physical quantity using a boundary element method as the numerical analysis method.

With this construction, analysis can be made using only the information on the boundary by using Green's function and a basic solution, thereby making an area to be divided smaller by one dimension. Thus, time and labor required for the division into elements can be considerably reduced. Further, if an abnormality such as a crack is created, for example, in the structure, it can be flexibly dealt with unlike the case of adopting a finite element method.

In the above structure monitor system, the numerically analyzing means may divide the structure into two areas partly overlapping each other; calculate physical quantities at points in an overlapping area of the two areas by a boundary element method while calculating an analyzed physical quantity at a point in one area; and calculate an analyzed physical quantity at a point in the other area by a finite element method using the analyzed physical quantities in the overlapping area.

With this construction, the analyzed physical quantity of the structure can be calculated while making the most use of the advantages of the two numerical analysis methods, i.e. the boundary element method and the finite element method. Specifically, in the case of applying the structure monitor system, for example, to the monitoring of the falling of pieces resulting from a damage of the inner wall of a tunnel, it is necessary to analyze the creation of a crack with high precision in an area near the outer surface of the structure frequently used as the boundary of the structure. Accordingly, the analyzed physical quantity is calculated by the boundary element method suitable for a crack analysis problem. On the other hand, even if a crack is, for example, created in an area far-distant from the outer surface of the structure, it does not immediately result in the falling of pieces. Thus, the analyzed physical quantity is calculated by the more generally used finite element method in the case that a change in the object to be analyzed such as a crack can be ignored.

In the above structure monitor system, the measuring means may preferably measure a distortion as the physical quantity a plurality of times at least for the substantially same point; and the numerically analyzing means preferably recognizes that a crack has been created in the structure when the measured distortion by the measuring means exceeds a specified permissible range, calculates an assumed distortion at a specified reference point of the structure by the boundary element method assuming the position and shape of the crack, and comparing the assumed distortion and a measured distortion at the reference point and executing calculation according to an optimization method to identify the position and shape of the crack.

With this construction, the position and shape of the crack can be estimated with high precision, and the structure can be monitored with higher precision.

In the above structure monitor system, the measuring means may preferably measure a temperature as the physical quantity a plurality of times at least for substantially the same point; and the numerically analyzing means preferably recognizes that an abnormally high temperature part has been produced in the structure when the measured temperature by the measuring means exceeds a specified permissible range, calculates an assumed temperature at a specified reference point of the structure by the boundary element method assuming the position and shape of the abnormally high temperature part, and comparing the assumed temperature and a measured temperature at the reference point and executing calculation according to an optimization method to identify the position and shape of the abnormally high temperature part.

With this construction, the position and distributed state of the abnormally high temperature part can be estimated with high precision, and the structure can be monitored with higher precision.

In the above structure monitor system, the numerically analyzing means may preferably calculate the analyzed physical quantity by approximating the boundary condition on an infinite boundary to zero in the case of analyzing a specified point in the structure having the infinite boundary sufficiently distant from the specified point to be analyzed by the numerically analyzing means to make the boundary condition ignorable.

With this construction, an unknown boundary condition in the numerically analyzing means can be supplemented, and the present invention can be applied to a wider range of structures to be monitored.

In the above structure monitor system, the measuring means may preferably include a confirmation measuring means laid at an arbitrary position of the structure for measuring physical quantities at points of the laid position of the confirmation measuring means. The numerically analyzing means may preferably calculate the analyzed physical quantities at the points where the physical quantity is measured by the confirmation measuring means. The display means may preferably display information on the comparison of the measured physical quantity and the analyzed physical quantity at the same point.

With this construction, the estimation precision by the numerically analyzing means can be confirmed by comparing the analyzed physical quantity as an analysis result by the numerically analyzing means with an actual measurement value by the confirmation measuring means. The precision can be improved, for example, by resetting the division into elements based on this confirmation result.

In such a case, it is preferable that the optical fiber sensor also serves as the confirmation measuring means.

With this construction, time and later to lay the confirmation measuring means can be dispensed with. Further, a cost incurred for the laying of the confirmation measuring means can be suppressed.

In the above structure monitor system, the display means may be preferably provided separately from the numerically analyzing means and be connected with the numerically analyzing means via a communication means for transmitting and receiving information.

With this construction, the analyzed physical quantity can be obtained regardless of the installation place of the numerically analyzing means.

In the above structure monitor system, the optical fiber sensor may be preferably coated with a magnetically distortable member that is deformed according to a magnetic force.

With this construction, since the optical fiber sensor is deformed according to the magnetic force, a magnetic field can be calculated by the measuring means using the optical fiber sensor. Thus, a magnetic field of the structure can be measured, thereby widening the range of physical quantities as objects to be analyzed.

The invention claimed is:

1. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid on the boundary of the structure, measuring physical quantities of the structure at points on the boundary of the structure where the optical fiber sensor is laid, a setting and inputting means for inputting data to make a modeling for the structure;

a numerically analyzing means for calculating the physical quantity at the specified point of the structure by the numerical analysis method using the measured physical quantities by the measuring means as the boundary condition, the numerically analyzing means receiving inputted data to make a modeling, and remake a new modeling based on a result of the calculation of the physical quantity; and a display means for displaying information on the analyzed physical quantity by the numerical analyzing means in relation to the position of the structure.

2. A structure monitor system according to claim 1, further comprising a notifying means for giving a notification if the analyzed physical quantity by the numerically analyzing means exceeds a predetermined physical quantity.

3. A structure monitor system according to claim 1, wherein the optical fiber sensor is laid on the outer surface of the structure.

4. A structure monitor system according to claim 1, wherein the numerically analyzing means calculates the analyzed physical quantity using a boundary element method as the numerical analysis method.

5. A structure monitor system according to claim 1, wherein:

the measuring means includes a confirmation measuring means laid at an arbitrary position of the structure for measuring physical quantities at points of the laid position of the confirmation measuring means, the numerically analyzing means calculates the analyzed physical quantities at the points where the physical quantity is measured by the confirmation measuring means, and the display means displays information on the comparison of the measured physical quantity and the analyzed physical quantity at the specified point.

6. A structure monitor system according to claim 5, wherein the optical fiber sensor also serves as the confirmation measuring means.

7. A structure monitor system according to claim 1, wherein the display means is provided separately from the numerically analyzing means and is connected with the numerically analyzing means via a communication means for transmitting and receiving information.

8. A structure monitor system according to claim 1, wherein the optical fiber sensor is coated with a magnetically distortable member that is deformed according to a magnetic force.

9. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid at least either on the boundary of the structure or inside the structure, measuring the physical quantity of the structure at points on a part where the optical fiber sensor is laid, a setting and inputting means for inputting data to make a modeling for the structure;

a numerically analyzing means for deriving physical quantities at points on the boundary of the structure where the optical fiber sensor is not laid, the physical quantities are converted for input as the boundary condition, from the governing equation using the measured physical quantities by the measuring means, and calculating an analyzed physical quantity at a specified point of the structure by the numerical analysis method using at least either the derived physical quantities or the measured physical quantities on the boundary as the boundary condition, the numerically analyzing means receiving inputted data to make a modeling, and remake a new modeling based on a result of the calculation of the physical quantity; and a display means for displaying information on the analyzed physical quantity by the numerically analyzing means in relation to the position of the structure.

10. A structure monitor system according to claim 9, further comprising a notifying means for giving a notification if the analyzed physical quantity by the numerically analyzing means exceeds a predetermined physical quantity.

11. A structure monitor system according to claim 9, wherein the optical fiber sensor is laid on the outer surface of the structure.

12. A structure monitor system according to claim 9, wherein the numerically analyzing means calculates the analyzed physical quantity using a boundary element method as the numerical analysis method.

13. A structure monitor system according to claim 9, wherein:

the measuring means includes a confirmation measuring means laid at an arbitrary position of the structure for measuring physical quantities at points of the laid position of the confirmation measuring means, the numerically analyzing means calculates the analyzed physical quantities at the points where the physical quantity is measured by the confirmation measuring means, and the display means displays information on the comparison of the measured physical quantity and the analyzed physical quantity at the specified point.

14. A structure monitor system according to claim 13, wherein the optical fiber sensor also serves as the confirmation measuring means.

15. A structure monitor system according to claim 9, wherein the display means is provided separately from the numerically analyzing means and is connected with the numerically analyzing means via a communication means for transmitting and receiving information.

16. A structure monitor system according to claim 9, wherein the optical fiber sensor is coated with a magnetically distortable member that is deformed according to a magnetic force.

17. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid at least either on the boundary of the structure or inside the structure, measuring the physical quantity of the structure at points on a part where the optical fiber sensor is laid, a numerically analyzing means for deriving physical quantities at points on the boundary of the structure where the optical fiber sensor is not laid, the physical quantities are converted for input as the boundary condition, from the governing equation using the measured physical quantities by the measuring means, and calculating an analyzed physical quantity at a specified point of the structure by the numerical analysis method using at least either the derived physical quantities or the measured physical quantities on the boundary as the boundary condition, wherein the numerically analyzing means divides the structure into two areas partly overlapping each other; calculates physical quantities at points in an overlapping area of the two areas by a boundary element method while calculating an analyzed physical quantity at a point in one area; and calculates an analyzed physical quantity at a point in the other area by a finite element method using the analyzed physical quantities in the overlapping area, and a display means for displaying information on the analyzed physical quantity by the numerically analyzing means in relation to the position of the structure.

18. A structure monitor system for analyzinng a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid at least either on the boundary of the structure or inside the structure, measuring the physical quantity of the structure at points on a part where the optical fiber sensor is laid, wherein the measuring means measures a distortion as the physical quantity a plurality of times at least for the specified point, a numerically analyzing means for deriving physical quantities at points on the boundary of the structure where the optical fiber sensor is not laid, the physical quantities are converted for input as the boundary condition, from the governing equation using the measured physical quantities by the measuring means, and calculating an analyzed physical quantity, at a specified point of the structure by the numerical analysis method using at least either the derived physical quantities or the measured physical quantities on the boundary as the boundary condition, wherein the numerically analyzing means calculates the analyzed physical quantity using a boundary element method as the numerical analysis method and recognizes that a crack has been created in the structure when the measured distortion by the measuring means exceeds a specified permissible range; calculates an assumed distortion at a specified reference point of the structure by the boundary element method assuming the position and shape of the crack; and comparing the assumed distortion and a measured distortion at the reference point and executing calculation according to an optimization method to identify the position and shape of the crack, and a display means for displaying information on the analyzed physical quantity by the numerically analyzing means in relation to the position of the structure.

19. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid at least either on the boundary of the structure or inside the structure, measuring the physical quantity of the structure at points on a part where the optical fiber sensor is laid, wherein the measuring means measures a temperature as the physical quantity a plurality of times at least for the specified point, a numerically analyzing means for deriving physical quantities at points on the boundary of the structure where the optical fiber sensor is not laid, the quantities are converted for input as the boundary condition, from the governing equation using the measured physical quantities by the measuring means, and calculating an analyzed physical quantity at a specified point of the structure by the numerical analysis method using at least either the derived physical quantities or the measured physical quantities on the boundary as the boundary condition, wherein the numerically analyzing means calculates the analyzed physical quantity using a boundary element method as the numerical analysis method and recognizes that an abnormally high temperature part has been produced in the structure when the measured temperature by the measuring means exceeds a specified permissible range; calculates an assumed temperature at a specified reference point of the structure by the boundary element method assuming the position and shape of the abnormally high temperature part; and comparing the assumed temperature and a measured temperature at the reference point and executing calculation according to an optimization method to identify the position and shape of the abnormally high temperature part, and a display means for displaying information on the analyzed physical by the numerically analyzing means in relation to the position of the structure.

20. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid at least either on the boundary of the structure or inside the structure, measuring the physical quantity of the structure at points on a part where the optical fiber sensor is laid, a numerically analyzing means for deriving physical quantities at points on the boundary of the structure where the optical fiber sensor is not laid, the physical quantities are converted for input as the boundary condition, from the governing equation using the measured physical quantities by the measuring means, and calculating an analyzed physical quantity at a specified point of the structure by the numerical analysis method using at least either the derived physical quantities or the measured physical quantities on the boundary as the boundary condition, wherein the numerically analyzing means calculates the analyzed physical quantity by approximating the boundary condition on an infinite boundary to zero in the case of analyzing a specified point in the structure having the infinite boundary sufficiently distant from the specified point to be analyzed by the numerically analyzing means to make the boundary condition ignorable.

21. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid on the boundary of the structure, measuring physical quantities of the structure at points on the boundary of the structure where the optical fiber sensor is laid, wherein the measuring means measures a distortion as the physical quantity a plurality of times at least for the specified point, a numerically analyzing means for calculating the physical quantity at the specified point of the structure by a boundary element method as the numerical analysis method using the measured physical quantities by the measuring means as the boundary condition, and the numerically analyzing means recognizes that a crack has been created in the structure when the measured distortion by the measuring means exceeds a specified permissible range; calculates an assumed distortion at a specified reference point of the structure by the boundary element method assuming the position and shape of the crack; and comparing the assumed distortion and a measured distortion at the reference point and executing calculation according to an optimization method to identify the position and shape of the crack, and a display means for displaying information on the analyzed physical quantity by the numerical analyzing means in relation to the position of the structure.

22. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid on the boundary of the structure, measuring physical quantities of the structure at points on the boundary of the structure where the optical fiber sensor is laid, wherein the measuring means measures a temperature as the physical quantity a plurality of times at least for the specified point, a numerically analyzing means for calculating the physical quantity at the specified point of the structure by a boundary element method as the numerical analysis method using the measured physical quantities by the measuring means as the boundary condition, and the numerically analyzing means recognizes that an abnormally high temperature part has been produced in the structure when the measured temperature by the measuring means exceeds a specified permissible range; calculates an assumed temperature at a specified reference point of the structure by the boundary element method assuming the position and shape of the abnormally high temperature part; and comparing the assumed temperature and a measured temperature at the reference point and executing calculation according to an optimization method to identify the position and shape of the abnormally high temperature, and a display means for displaying information on the analyzed physical quantity by the numerical analyzing means in relation to the position of the structure.

23. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid on the boundary of the structure, measuring physical quantities of the structure at points on the boundary of the structure where the optical fiber sensor is laid, wherein a numerically analyzing means for calculating the physical quantity at the specified point of the structure by the numerical analysis method using the measured physical quantities by the measuring means as the boundary condition, wherein the numerically analyzing means divides the structure into two areas partly overlapping each other; calculates physical quantities at points in an overlapping area of the two areas by a boundary element method while calculating an analyzed physical quantity at a point in one area; and calculates an analyzed physical quantity at a point in the other area by a finite element method using the analyzed physical quantities in the overlapping area, and a display means for displaying information on the analyzed physical quantity by the numerical analyzing means in relation to the position of the structure.

24. A structure monitor system for analyzing a physical quantity at a specified point of a structure, in which the physical quantity at one point on a boundary or inside of the structure is expressed by a governing equation, by a numerical analysis method by setting a specific boundary condition, and monitoring the structure based on the analysis result, comprising:

a measuring means for, using an optical fiber sensor laid on the boundary of the structure, measuring physical quantities of the structure at points on the boundary of the structure where the optical fiber sensor is laid, a numerically analyzing means for deriving physical quantities at points on the boundary of the structure where the optical fiber sensor is not laid, the physical quantities are converted for input as the boundary condition, from the governing equation using the measured physical quantities by the measuring means, and calculating an analyzed physical quantity at a specified point of the structure by the numerical analysis method using at least either the derived physical quantities or the measured physical quantities on the boundary as the boundary condition, wherein the numerically analyzing means calculates the analyzed physical quantity by approximating the boundary condition on an infinite boundary to zero in the case of analyzing a specified point in the structure having the infinite boundary sufficiently distant from the specified point to be analyzed by the numerically analyzing means to make the boundary condition ignorable.

* * * * *